United States Patent
Katta et al.

(10) Patent No.: US 11,792,133 B2
(45) Date of Patent: *Oct. 17, 2023

(54) SYSTEMS AND METHODS FOR PERFORMING HEADER PROTECTION IN DISTRIBUTED SYSTEMS

(71) Applicant: Citrix Systems, Inc., Fort Lauderdale, FL (US)

(72) Inventors: Rama Rao Katta, Fremont, CA (US); Kasirao Velugu, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,286

(22) Filed: Jun. 7, 2022

(65) Prior Publication Data

US 2022/0303226 A1 Sep. 22, 2022

Related U.S. Application Data

(63) Continuation of application No. 17/082,916, filed on Oct. 28, 2020, now Pat. No. 11,381,517.

(51) Int. Cl.
*H04L 47/783* (2022.01)
*H04L 47/72* (2022.01)
(Continued)

(52) U.S. Cl.
CPC ............ *H04L 47/783* (2013.01); *H04L 47/72* (2013.01); *H04L 47/762* (2013.01); *H04L 67/146* (2013.01); *H04L 69/22* (2013.01)

(58) Field of Classification Search
CPC ..... H04L 47/72; H04L 47/762; H04L 47/783; H04L 67/146
See application file for complete search history.

(56) References Cited

U.S. PATENT DOCUMENTS 6,055,637 A 4/2000 Hudson et al.
7,739,253 B1 6/2010 Yanovsky et al.
(Continued)

FOREIGN PATENT DOCUMENTS

WO WO-2018/178727 A1 10/2018

OTHER PUBLICATIONS

"Cross-Site Request Forgery Prevention—OWASP Cheat Sheet Series"; "The Wayback Machine—https://web.archive.org/web/20200826184411/https://cheatsheetseries.owasp.org/cheatsheets/Cross-Site_Request_Forgery_Prevention_Cheat_Sheet.html"; Aug. 26, 2020 (Year: 2020).

(Continued)

*Primary Examiner* — Jerry B Dennison

(57) ABSTRACT

Described embodiments provide systems and methods performing header protection. A device can receive from a client, a request relating to a first resource, for a second resource. The device can determine, using an identifier for the session, whether an address of the first resource has been previously accessed by the client during the session. The device can verify, using an address of the second resource, whether the address of the second resource is mapped to the address of the first resource for the session between the client and the device. The device can determine whether to provide access to the second resource responsive to the address of the first resource being previously accessed by the client during the session and the address of the second resource being mapped to the address of the first resource for the session.

20 Claims, 8 Drawing Sheets

(51) Int. Cl.
    *H04L 47/762*     (2022.01)
    *H04L 67/146*     (2022.01)
    *H04L 69/22*     (2022.01)

(56) References Cited

U.S. PATENT DOCUMENTS

| | | |
|---|---|---|
| 9,336,321 B1 | 5/2016 | Hayden |
| 9,780,951 B2 | 10/2017 | Hunt et al. |
| 9,843,643 B2 | 12/2017 | Martha et al. |
| 10,356,050 B1 | 7/2019 | Kumar et al. |
| 10,581,878 B2 | 3/2020 | Ng et al. |
| 10,628,560 B1 | 4/2020 | Siranni et al. |
| 10,997,290 B2 | 5/2021 | Shafet et al. |
| 11,240,635 B1 | 2/2022 | Eckert et al. |
| 2008/0320567 A1* | 12/2008 | Shulman ............ H04L 63/1441 726/4 |
| 2010/0094612 A1 | 4/2010 | Weerasinghe |
| 2011/0154472 A1 | 6/2011 | Anderson et al. |
| 2011/0154473 A1 | 6/2011 | Anderson et al. |
| 2012/0180129 A1 | 7/2012 | Shulman et al. |
| 2016/0103801 A1 | 4/2016 | Bortz et al. |
| 2017/0149803 A1 | 5/2017 | Lo et al. |
| 2018/0109540 A1 | 4/2018 | Amar et al. |
| 2018/0262472 A1 | 9/2018 | Frederick et al. |
| 2019/0297147 A1 | 9/2019 | Drasin et al. |
| 2019/0303601 A1 | 10/2019 | Newman |
| 2019/0379675 A1 | 12/2019 | Johns |
| 2020/0128086 A1 | 4/2020 | Lewis et al. |
| 2020/0358798 A1 | 11/2020 | Maylor et al. |
| 2021/0014221 A1 | 1/2021 | Kukreja et al. |
| 2021/0264464 A1 | 8/2021 | Vock et al. |
| 2021/0306371 A1* | 9/2021 | Majkowski ......... H04L 63/1425 |

OTHER PUBLICATIONS

International Search Report and Written Opinion on PCT Appl. No. PCT/US2021/054166 dated Jan. 19, 2022.

Mohd, "Cross Site Request Forgery: A common web application weakness", IEEE 2011 (Year: 2011).

Non-Final Office Action on U.S. Appl. No. 17/082,916 dated Sep. 1, 2021.

Notice of Allowance on U.S. Appl. No. 17/082,916 dated Mar. 3, 2022.

* cited by examiner

SYSTEMS AND METHODS FOR PERFORMING HEADER PROTECTION IN DISTRIBUTED SYSTEMS

CROSS-REFERENCE TO RELATED APPLICATION

This application is a continuation of and claims priority to and the benefit of U.S. patent application Ser. No. 17/082,916, titled "SYSTEMS AND METHODS FOR PERFORMING HEADER PROTECTION IN DISTRIBUTED SYSTEMS," and filed on Oct. 28, 2020, the contents of all of which are hereby incorporated herein by reference in its entirety for all purposes.

BACKGROUND

In network environments, a client can access a plurality of resources or applications provided through a server. A device may monitor the client accessing the resources or applications over the network environment.

SUMMARY

Systems and method for performing header protection (e.g., REFERER header protection) in distributed systems are provided herein. A device intermediary to a plurality of clients and a plurality of servers can track and monitor requests from the clients for resources of the servers to prevent malicious requests such as, but not limited to, bad actors accessing the resources or prevent cross site forgery request (CSFR) attacks. The device can determine whether to provide access to a requested resource responsive to an address of a first resource that the request was received from being included in an access list maintained by the device and the address of the requested resource being mapped to the address of the first resource on a mapping list maintained by the device.

The device can establish a session with the client in response to an initial request for a resource from the client. A session identifier can be created for the session between the client and the device to track subsequent requests received during the session, for example, links or addresses accessed by the client during the session. The resource can be provided or hosted by a server and the device can received the requested resource from the server. The device can generate a unique identifier for the resource and include the resource in an access list indicating resources access by the client during the session. The resource can include one or more addresses (e.g., uniform resource locators (URLs) to access additional resources (e.g., web pages) from the server. The device can identify each of the one or more addresses and create a unique identifier for each address. The addresses and corresponding unique identifiers can be mapped to the address of the resource in a mapping list or database maintained by the device.

The device can provide a response to the client including the requested resource and session identifier. For subsequent requests for subsequent resources received from the client through an address of the first resource, the device can use the session identifier to retrieve session details, such as but not limited to, the access list and mapping list. The device can determine if an address of the first resource the subsequent request was received from is included on the access list and if the address is included on the mapping list. The device can use the mapping list to verify if the requested subsequent resource is mapped with the address of the first resource the request was received from. For example, the device can determine if the address of the subsequent resource was previously mapped or associated with the address of the first resource the request was received from. In embodiments, if the device determines that the address of the first resource the subsequent request was received from is not included on the access list or if the address is not included on the mapping list, the device can deny the subsequent request. In embodiments, if the device determines that the address of the subsequent resource is not mapped or associated with the address of the first resource the request was received from, the device can deny the subsequent request. The device can prevent or provide access based in part on the resource the request was received through and address details of the requested resource to prevent attacks, malicious requests for resources from bad actors or prevents bots from randomly crawling websites.

In at least one aspect, a method is provided. The method can include receiving, by a device from a client, a request for a second resource, the request relating to a first resource and the request including an identifier of a session between the client and the device. The method can include determining, by the device using the identifier, whether an address of the first resource has been previously accessed by the client during the session. The method can include verifying, by the device using an address of the second resource, whether the address of the second resource is mapped to the address of the first resource for the session between the client and the device. The method can include determining, by the device, whether to provide access to the second resource responsive to the address of the first resource being previously accessed by the client during the session and the address of the second resource being mapped to the address of the first resource for the session.

In embodiments, the method can include denying, by the device, the request for the second resource responsive to the address of the first resource being different from one or more addresses previously accessed by the client during the session or the address of the second resource not being mapped to the address of the first resource for the session. The method can include providing, by the device, access to the second resource responsive to the address of the first resource being previously accessed by the client during the session and the address of the second resource being mapped to the address of the first resource for the session. The method can include retrieving, by the device using the identifier, details for the session between the client and the device. The details can include a first list indicating one or more addresses accessed by the client during the session and a second list indicating addresses mapped to one or more other addresses and approved for the client to access during the session. The method can include determining, by the device using the identifier, whether the address of the first resource is included in a list indicating addresses previously accessed by the client during the session. The method can include determining, by the device, whether the address of the second resource is mapped to the address of the first resource in a list indicating addresses previously mapped by the device for access by the client during the session.

In embodiments, the method can include establishing, by the device responsive to a request to access the first resource, the session between client and the device. The method can include generating, by the device, the identifier for the session between client and the device to track subsequent requests relating to the first resource during the session. The method can include receiving, by the device from a server, the first resource including one or more addresses. The method can include determining, by the device, the one or more addresses included with the first resource. In embodiments, each address of the one or more addresses can provide access to a different resource.

The method can include generating, by the device, an identifier for each address of one or more addresses included with the first resource. The method can include mapping, by the device, the address of the first resource to each identifier of each address of the one or more addresses in a list indicating addresses approved for access by the client responsive to requests relating to the first resource. The method can include providing, by the device to the client, the first resource including one or more addresses linked to other resources associated with the first resource and the identifier for the session between the client and the device.

In at least one aspect, a system is provided. The system can include a device comprising one or more processors coupled to memory. The device can be configured to receive, from a client through a first resource, a request for a second resource. The request can include an identifier of a session between the client and the device and identifies an address of the first resource. The device can be configured to determine, using the identifier, whether an address of the first resource has been previously accessed by the client during the session. The device can be configured to verify, using an address of the second resource, whether the address of the second resource is mapped to the address of the first resource for the session between the client and the device. The device can be configured to determine whether to provide access to the second resource responsive to the address of the first resource being previously accessed by the client during the session and the address of the second resource being mapped to the address of the first resource for the session.

In embodiments, the device can be configured to deny the request for the second resource responsive to the address of the first resource being different from one or more addresses previously accessed by the client during the session or the address of the second resource not being mapped to the address of the first resource for the session. The device can be configured to provide access to the second resource responsive to the address of the first resource being previously accessed by the client during the session and the address of the second resource being mapped to the address of the first resource for the session.

The device can be configured to establish, responsive to a request to access the first resource, the session between client and the device. The device can be configured to generate the identifier for the session between client and the device to track subsequent requests relating to the first resource during the session. The device can be configured to retrieve, using the identifier, details for the session between the client and the device. The details can include a first list indicating one or more addresses accessed by the client during the session and a second list indicating addresses mapped to one or more other addresses and approved for the client to access during the session.

The device can be configured to determine, using the identifier, whether the address of the first resource is included in a list indicating addresses previously accessed by the client during the session. The device can be configured to determine whether the address of the second resource is mapped to the address of the first resource in a list indicating addresses previously mapped by the device for access by the client during the session.

In at least one aspect, a non-transitory computer-readable medium is provided. The non-transitory computer-readable medium comprising instructions that, when executed by the processor of a device, cause the processor to receive, from a client through a first resource, a request for a second resource. The request can include an identifier of a session between the client and the device and identifies an address of the first resource. The non-transitory computer-readable medium can include instructions that, when executed by the processor of a device, cause the processor to determine, using the identifier, whether an address of the first resource has been previously accessed by the client during the session. The non-transitory computer-readable medium can include instructions that, when executed by the processor of a device, cause the processor to verify, using an address of the second resource, whether the address of the second resource is mapped to the address of the first resource for the session between the client and the device. The non-transitory computer-readable medium can include instructions that, when executed by the processor of a device, cause the processor to determine whether to provide access to the second resource responsive to the address of the first resource being previously accessed by the client during the session and the address of the second resource being mapped to the address of the first resource for the session.

In embodiments, the non-transitory computer-readable medium can include instructions that, when executed by the processor of a device, cause the processor to deny the request for the second resource responsive to the address of the first resource being different from one or more addresses previously accessed by the client during the session or the address of the second resource not being mapped to the address of the first resource for the session. The non-transitory computer-readable medium can include instructions that, when executed by the processor of a device, cause the processor to provide access to the second resource responsive to the address of the first resource being previously accessed by the client during the session and the address of the second resource being mapped to the address of the first resource for the session.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
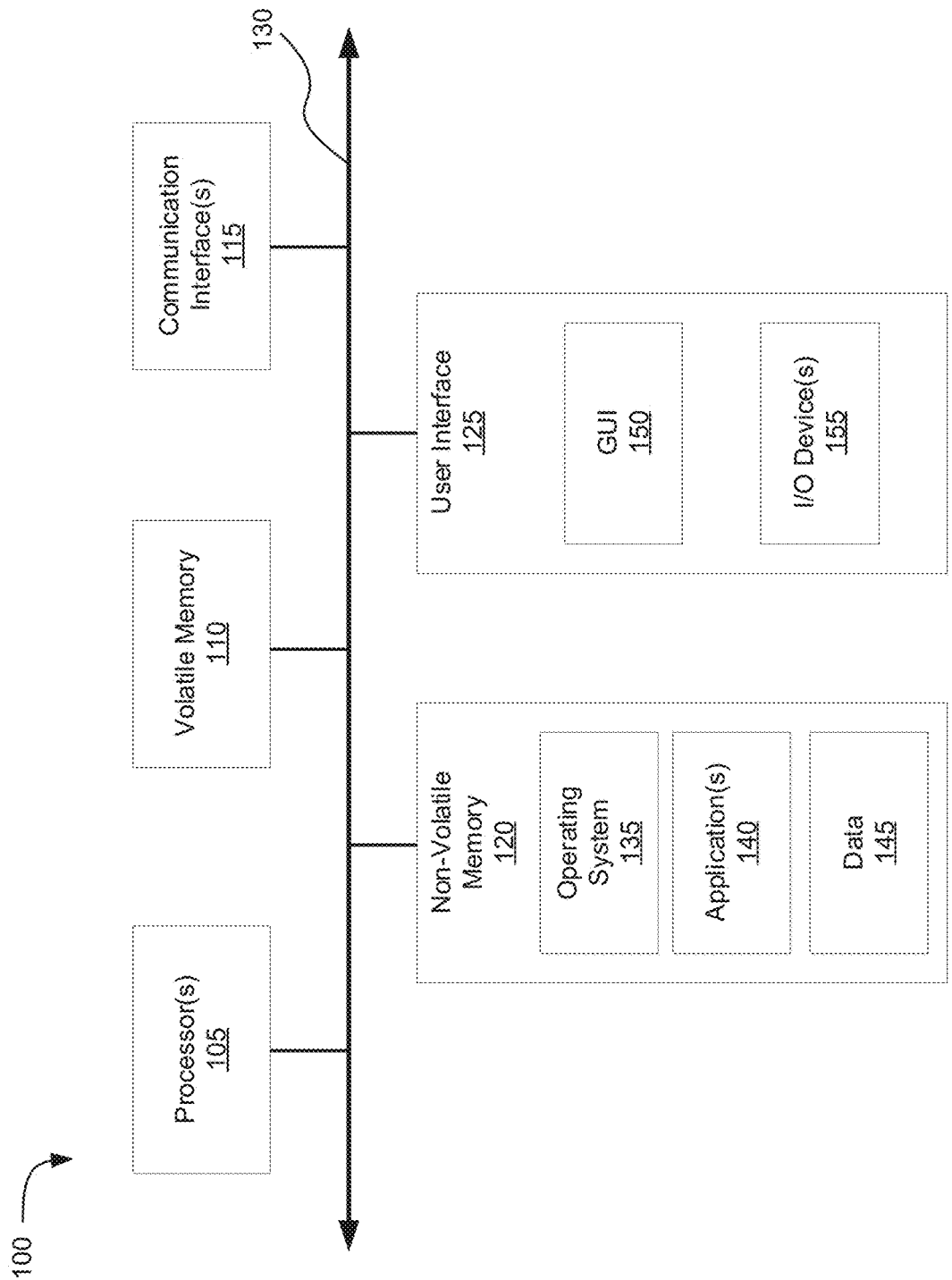
FIG. 1A is a block diagram of embodiments of a computing device.

Systems and method for performing header protection in distributed systems are provided herein. A device intermediary to a plurality of clients and a plurality of servers can determine whether to provide access to a requested resource responsive to an address of a first resource that the request originated from being included in an access list maintained by the device and an address of the requested resource being mapped to the address of the first resource on a mapping list maintained by the device.

A client can be provided an initial resource form a server, for example, in an HTTP response that includes a plurality of addresses (e.g., URLs, links) to additional resources (e.g., web pages, applications). The client can use the address of the resource to access additional resources through the addresses of the initial resource. However, bad actors or bots can obtain the address of the initial resource and use the address to randomly access web pages or applications or perform Cross Site Forgery Request (CSFR) attacks. For example, the client can transmit subsequent requests (e.g., HTTP request) for resources through the initial or first resource using at least one of the addresses provided in the resource. The request can identify the resource that the request originated from. In embodiments, a header portion of the request can identify an address of the initial resource the request originated from and the address of the initial resource can be linked to the currently requested resource. Thus, the address of the resource can be used to access additional resources of the server or resources provided through the addresses of the initial resource. However, bad actors or bots can obtain the address of the initial resource and use the address to randomly access web pages or applications or perform Cross Site Forgery Request (CSFR) attacks. The bad actors can fraudulently access the initial resource including the addresses (e.g., URLs, links) embedded within the resource or arrive at the initial resource using trial and error. The address of the initial resource (e.g., HTTP REFERER URL) can be used to bypass firewalls or protections on an intermediary device and access the other resources provided by the server. In embodiments, the bad actors can maliciously exploit the accessed resource and user data available through the resource compromising the maliciously accessed resource and user data available through the resource.

The systems and methods provided herein can prevent malicious attempts to access resources or data available through the resources by mapping an address of provided in an initial resource to the originating resource using both address information for an initial resource a request originated from and address information for a subsequent resource currently requested. A device (e.g., Application Delivery Controller (ADC)) can perform HTTP REFERER header protection to protect servers from malicious attempts to access resources or data available through the server or protect backend servers from randomly accessing one or more web services.

In embodiments, the device (e.g., ADC) can create a session for a client responsive to a first request from the client for a first or initial resource and a session identifier can be generated for the session that is valid for a configured timeout interval and used to track resources, addresses (e.g., URLs) and/or applications accessed by the client during the session. The device can tag or mark the first resource as accessed or seen in the session in an access list. For example, the device can create and maintain an access list for the session that identifies resources accessed by the client during the respective session. The device can generate a unique identifier for the first resource and include the identifier in the access list to indicate the client accessed the first resource. The unique identifier for the resource can include, but not limited to an encoded version of a URL of the resource. The device can identify a server that provides or hosts the requested first resource and transmit a request for the requested first resource to the first server. A response (e.g., HTTP response) can be received from the server that includes the resource. The device can parse the resource or response to identify one or more addresses (e.g., URLs, links) included in the resource or response.

The device can create and maintain a mapping list for the session that maps each address of the first resource to the first resource. For example, the device can generate a unique identifier for each address and map the unique identifier for each address to the unique identifier of the first resource in the mapping list. The device can use the mapping list to verify if a requested resource is associated with a previously accessed resource through the device and is a valid request versus a malicious request. The mapping list can include a 1:N mapping with the unique identifier for the first resource mapped to one or more (N) unique identifiers of addresses provided through the resource and thus associated with multiple responses and/or requests. In embodiments, the device can maintain the mapping data as global and set the "key" as the unique identifier of the first resource and the value as the set of unique identifiers of addresses provided through the first resource.

The device can provide the response to the client including the requested resource and the session identifier for the session between the client and the device. Subsequent requests from the client during the session can include the session identifier. For example, for a subsequent request, the device can identify or extract the session identifier (e.g., cookie) from the request (e.g., from a header of the request) and validate the session identifier. The device can use the session identifier to retrieve data and information associated with the session, including but not limited to, the access list and the mapping list.

The device can determine if the address of the first resource that the subsequent request originated from is included on the access list or is a fraudulent request. The device can determine if the address of the first resource that the subsequent request originated from is included on the mapping list or is a fraudulent request. Using the mapping list, the device can verify if the resource requested in the subsequent request is mapped to the address of the first resource that the subsequent request originated from. For example, the device can verify if a URL of the resource requested in the subsequent request is mapped to a URL of the first resource that the subsequent request originated from on the mapping list. The device can determine whether to provide access or prevent access to the requested resource in the subsequent request responsive to the address of the first resource that the request originated from being included in the access list and the address of the requested resource being mapped to the address of the first resource on the mapping list.

Section A describes a computing environment which may be useful for practicing embodiments described herein; and Section B describes a network environment and computing environment which may be useful for practicing embodiments described herein;

Section C describes methods and systems for performing header protection in distributed systems.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
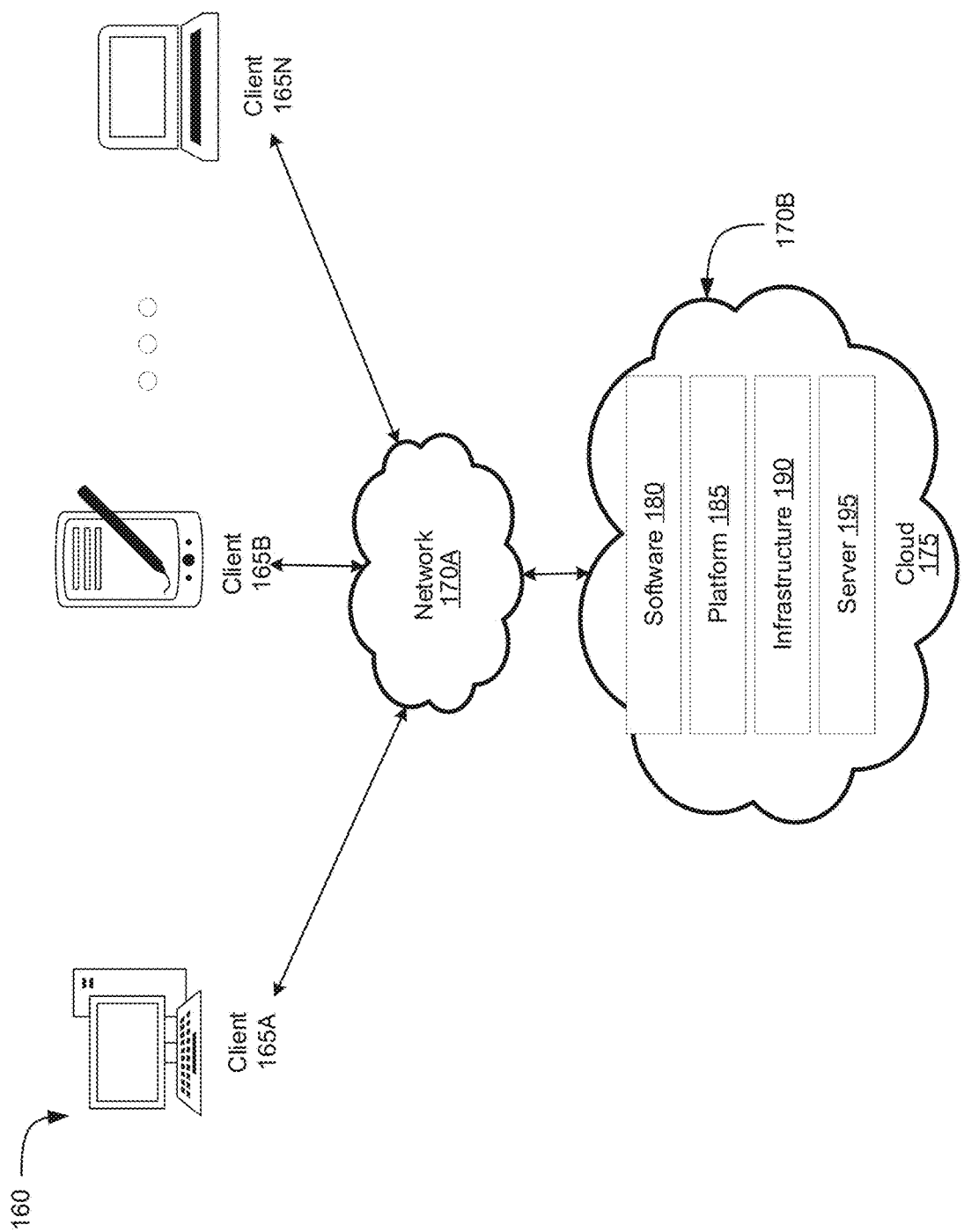
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Network and Computing Environment

Figure 2A:
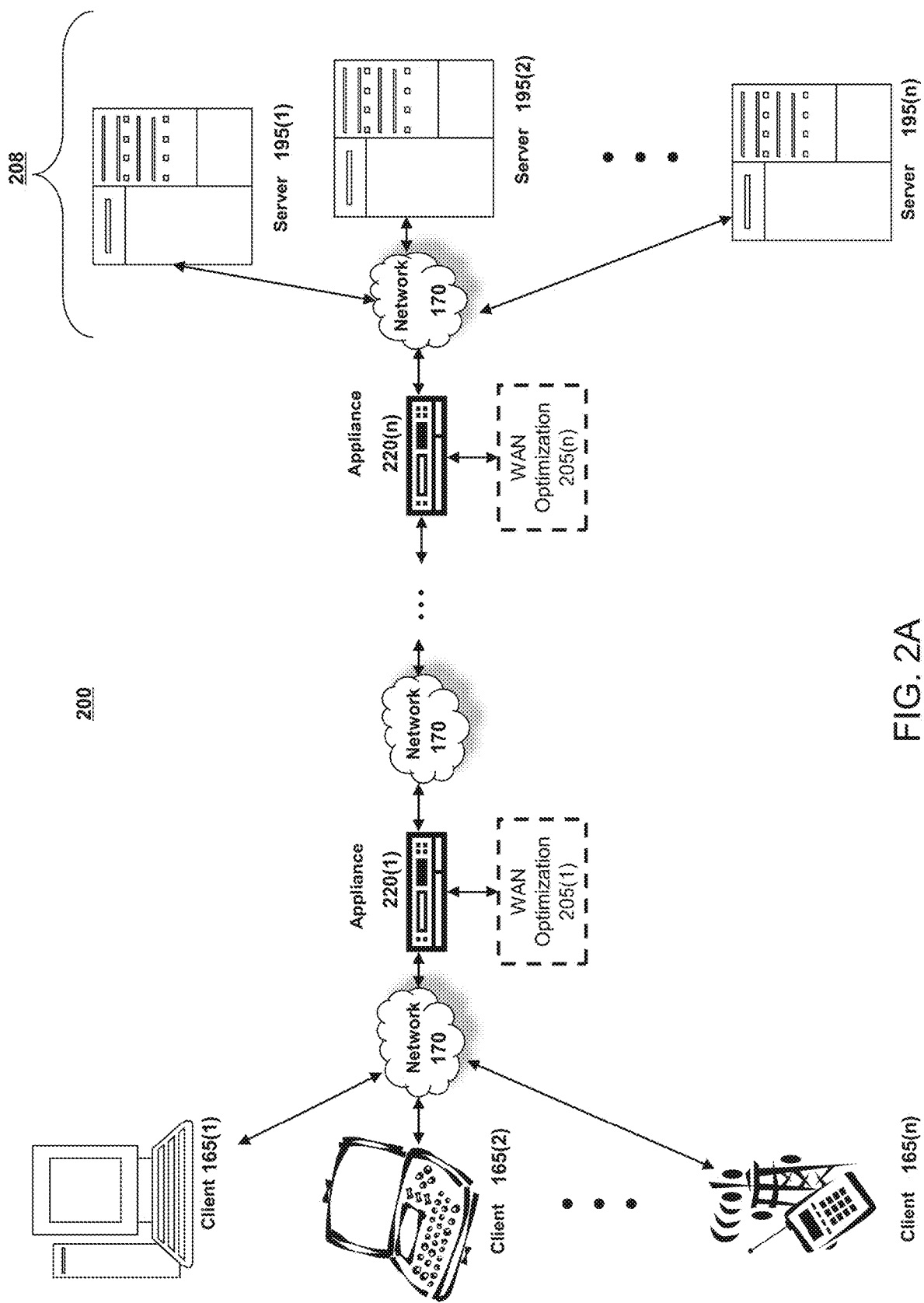
FIG. 2A is a block diagram of a network computing system, in accordance with an illustrative embodiment.

Referring to FIG. 2A, an illustrative network environment 200 is depicted. Network environment 200 may include one or more clients 165(1)-165(n) (also generally referred to as local machine(s) 165 or client(s) 165) in communication with one or more servers 195(1)-195(n) (also generally referred to as remote machine(s) 195 or server(s) 195) via one or more networks 170(1)-170n (generally referred to as network(s) 170). In some embodiments, a client 165 may communicate with a server 195 via one or more appliances 220(1)-220n (generally referred to as appliance(s) 220 or gateway(s) 220).

Although the embodiment shown in FIG. 2A shows one or more networks 170 between clients 165 and servers 195, in other embodiments, clients 165 and servers 195 may be on the same network 170. The various networks 170 may be the same type of network or different types of networks. For example, in some embodiments, network 170(1) may be a private network such as a local area network (LAN) or a company Intranet, while network 170(2) and/or network 170(n) may be a public network, such as a wide area network (WAN) or the Internet. In other embodiments, both network 170(1) and network 170(n) may be private networks. Networks 170 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 220 may be located at various points or in various communication paths of network environment 200. For example, appliance 220 may be deployed between two networks 170(1) and 170(2), and appliances 220 may communicate with one another to work in conjunction to, for example, accelerate network traffic between clients 165 and servers 195. In other embodiments, the appliance 220 may be located on a network 170. For example, appliance 220 may be implemented as part of one of clients 165 and/or servers 195.

As shown in FIG. 2A, one or more servers 195 may operate as a server farm 208. Servers 195 of server farm 208 may be logically grouped, and may either be geographically co-located (e.g., on premises) or geographically dispersed (e.g., cloud based) from clients 165 and/or other servers 195. In an embodiment, server farm 208 executes one or more applications on behalf of one or more of clients 165 (e.g., as an application server), although other uses are possible, such as a file server, gateway server, proxy server, or other similar server uses. Clients 165 may seek access to hosted applications on servers 195.

As shown in FIG. 2A, in some embodiments, appliances 220 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 220 may be a performance enhancing proxy or a WAN optimization controller.

Figure 2B:
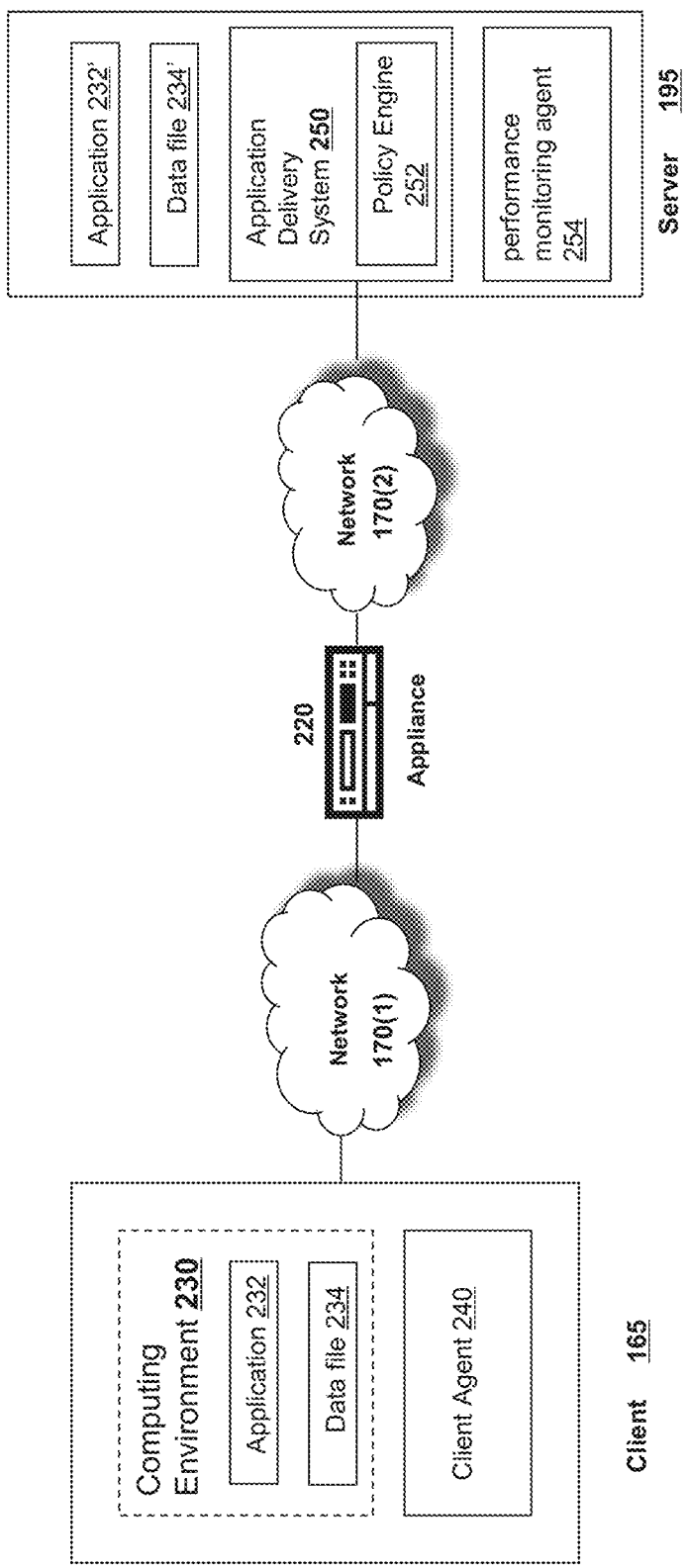
FIG. 2B is a block diagram of a network computing system for delivering a computing environment from a server to a client via an appliance, in accordance with an illustrative embodiment.

Referring to FIG. 2B, an example network environment, 200', for delivering and/or operating a computing network environment on a client 165 is shown. As shown in FIG. 2B, a server 195 may include an application delivery system 250 for delivering a computing environment, application, and/or data files to one or more clients 165. Client 165 may include client agent 240 and computing environment 230. Computing environment 230 may execute or operate an application, 16, that accesses, processes or uses a data file 234. Computing environment 230, application 232 and/or data file 234 may be delivered via appliance 220 and/or the server 195.

Appliance 220 may accelerate delivery of all or a portion of computing environment 230 to a client 165, for example by the application delivery system 250. For example, appliance 220 may accelerate delivery of a streaming application and data file processable by the application from a data center to a remote user location by accelerating transport layer traffic between a client 165 and a server 195. Such acceleration may be provided by one or more techniques, such as: 1) transport layer connection pooling, 2) transport layer connection multiplexing, 3) transport control protocol buffering, 4) compression, 5) caching, or other techniques.

Appliance 220 may also provide load balancing of servers 195 to process requests from clients 165, act as a proxy or access server to provide access to the one or more servers 195, provide security and/or act as a firewall between a client 165 and a server 195, provide Domain Name Service (DNS) resolution, provide one or more virtual servers or virtual internet protocol servers, and/or provide a secure virtual private network (VPN) connection from a client 165 to a server 195, such as a secure socket layer (SSL) VPN connection and/or provide encryption and decryption operations.

Application delivery management system 250 may deliver computing environment 230 to a user (e.g., client 165), remote or otherwise, based on authentication and authorization policies applied by policy engine 252. A remote user may obtain a computing environment and access to server stored applications and data files from any network-connected device (e.g., client 165). For example, appliance 220 may request an application and data file from server 195. In response to the request, application delivery system 250 and/or server 195 may deliver the application and data file to client 165, for example via an application stream to operate in computing environment 230 on client 165, or via a remote-display protocol or otherwise via remote-based or server-based computing.

Policy engine 252 may control and manage the access to, and execution and delivery of, applications. For example, policy engine 252 may determine the one or more applications a user or client 165 may access and/or how the application should be delivered to the user or client 165, such as a server-based computing, streaming or delivering the application locally to the client 240 for local execution.

For example, in operation, a client 165 may request execution of an application (e.g., application 232') and application delivery system 250 of server 195 determines how to execute application 232', for example based upon credentials received from client 165 and a user policy applied by policy engine 252 associated with the credentials. For example, application delivery system 250 may enable client 165 to receive application-output data generated by execution of the application on a server 195, may enable client 165 to execute the application locally after receiving the application from server 195, or may stream the application via network 170 to client 165. For example, in some embodiments, the application may be a server-based or a remote-based application executed on server 195 on behalf of client 165. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 195 may include a performance monitoring service or agent 244. In some embodiments, a dedicated one or more servers 195 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 165 (e.g., client agent 240), servers 195 (e.g., agent 254) or an appliance 220. In general, monitoring agents (e.g., 240 and/or 254) execute transparently (e.g., in the background) to any application and/or user of the device.

The monitoring agents 240 and 254 may monitor, measure, collect, and/or analyze data on a predetermined frequency, based upon an occurrence of given event(s), or in real time during operation of network environment 200. The monitoring agents 240 and 254 may monitor resource consumption and/or performance of hardware, software, and/or communications resources of clients 165, networks 170, appliances 220 and/or WAN optimization appliances 205, and/or servers 195. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 240 and 254 may provide application performance management for application delivery system 250. For example, based upon one or more monitored performance conditions or metrics, application delivery system 250 may be dynamically adjusted, for example periodically or in real-time, to optimize application delivery by servers 195 to clients 165 based upon network environment performance and conditions.

In described embodiments, clients 165, servers 195, and appliances 220 and WAN optimization appliances 205 may be deployed as and/or executed on any type and form of computing device, such as any desktop computer, laptop computer, or mobile device capable of communication over at least one network and performing the operations described herein. For example, clients 165, servers 195 and/or appliances 220 and WAN optimization appliances 205 may each correspond to one computer, a plurality of computers, or a network of distributed computers such as computer 100 shown in FIG. 1A.

B. Appliance Architecture

Figure 3:
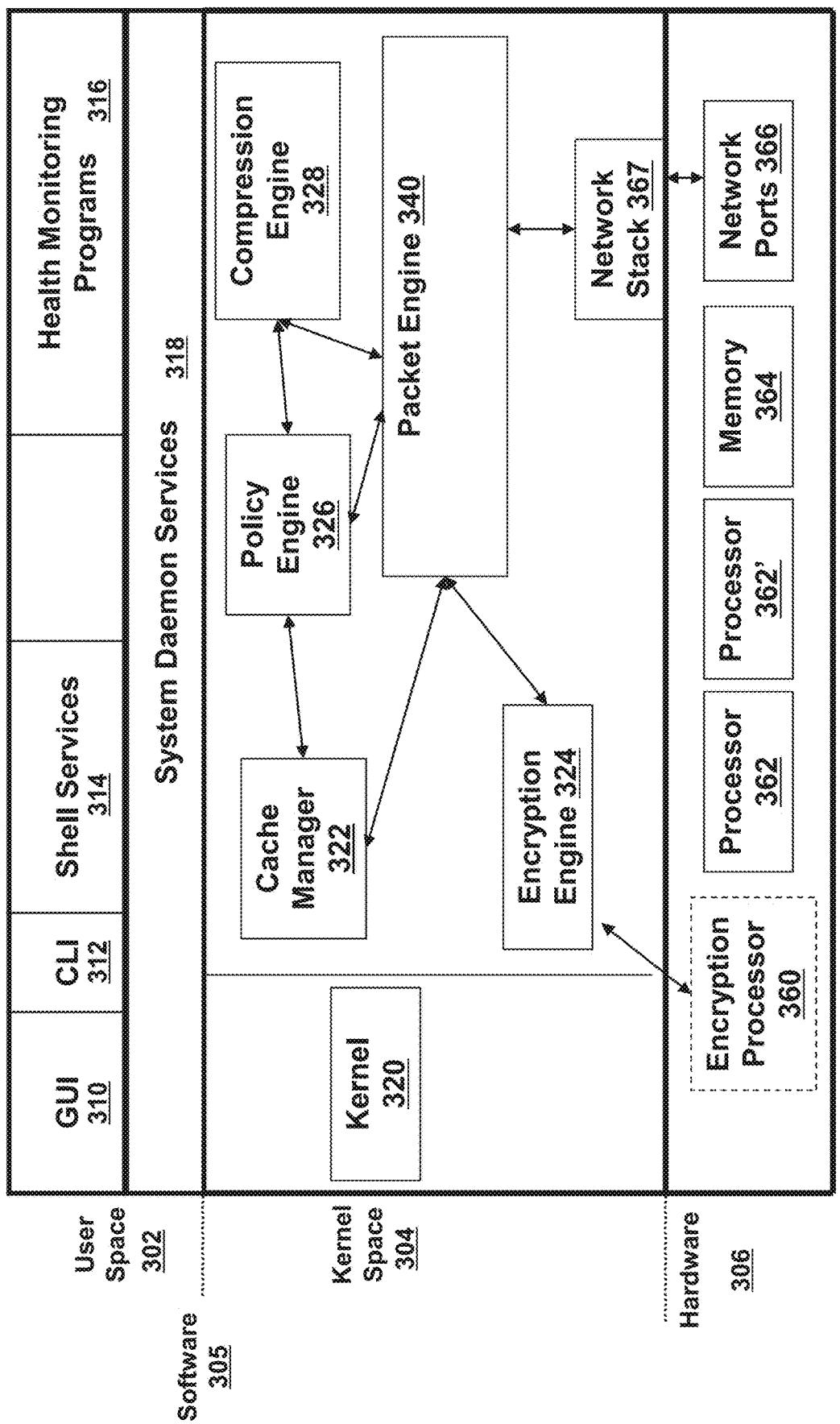
FIG. 3 is a block diagram of an appliance for processing communications between a client and a server, in accordance with an illustrative embodiment.

FIG. 3 shows an example embodiment of appliance 220. As described herein, appliance 220 may be implemented as a server, gateway, router, switch, bridge or other type of computing or network device. As shown in FIG. 3, an embodiment of appliance 220 may include a hardware layer 306 and a software layer 305 divided into a user space 302 and a kernel space 304. Hardware layer 306 provides the hardware elements upon which programs and services within kernel space 304 and user space 302 are executed and allow programs and services within kernel space 304 and user space 302 to communicate data both internally and externally with respect to appliance 220. As shown in FIG. 3, hardware layer 306 may include one or more processing units 362 for executing software programs and services, memory 364 for storing software and data, network ports 366 for transmitting and receiving data over a network, and encryption processor 360 for encrypting and decrypting data such as in relation to Secure Socket Layer (SSL) or Transport Layer Security (TLS) processing of data transmitted and received over the network.

An operating system of appliance 220 allocates, manages, or otherwise segregates the available system memory into kernel space 304 and user space 302. Kernel space 304 is reserved for running kernel 320, including any device drivers, kernel extensions or other kernel related software. As known to those skilled in the art, kernel 320 is the core of the operating system, and provides access, control, and management of resources and hardware-related elements of appliance 220. Kernel space 304 may also include a number of network services or processes working in conjunction with cache manager 322.

Appliance 220 may include one or more network stacks 367, such as a TCP/IP based stack, for communicating with client(s) 165, server(s) 195, network(s) 170, and/or other appliances 220 or WAN optimization appliances 205. For example, appliance 220 may establish and/or terminate one or more transport layer connections between clients 165 and servers 195. Each network stack 367 may include a buffer 243 for queuing one or more network packets for transmission by appliance 220.

Kernel space 304 may include cache manager 322, packet engine 340, encryption engine 324, policy engine 326 and compression engine 328. In other words, one or more of processes 322, 340, 324, 326 and 328 run in the core address space of the operating system of appliance 220, which may reduce the number of data transactions to and from the memory and/or context switches between kernel mode and user mode, for example since data obtained in kernel mode may not need to be passed or copied to a user process, thread or user level data structure.

Cache manager 322 may duplicate original data stored elsewhere or data previously computed, generated or transmitted to reducing the access time of the data. In some embodiments, the cache memory may be a data object in memory 364 of appliance 220, or may be a physical memory having a faster access time than memory 364.

Policy engine 326 may include a statistical engine or other configuration mechanism to allow a user to identify, specify, define or configure a caching policy and access, control and management of objects, data or content being cached by appliance 220, and define or configure security, network traffic, network access, compression or other functions performed by appliance 220.

Encryption engine 324 may process any security related protocol, such as SSL or TLS. For example, encryption engine 324 may encrypt and decrypt network packets, or any portion thereof, communicated via appliance 220, may setup or establish SSL, TLS or other secure connections, for example between client 165, server 195, and/or other appliances 220 or WAN optimization appliances 205. In some embodiments, encryption engine 324 may use a tunneling protocol to provide a VPN between a client 165 and a server 195. In some embodiments, encryption engine 324 is in communication with encryption processor 360. Compression engine 328 compresses network packets bi-directionally between clients 165 and servers 195 and/or between one or more appliances 220.

Packet engine 340 may manage kernel-level processing of packets received and transmitted by appliance 220 via network stacks 367 to send and receive network packets via network ports 366. Packet engine 340 may operate in conjunction with encryption engine 324, cache manager 322, policy engine 326 and compression engine 328, for example to perform encryption/decryption, traffic management such as request-level content switching and request-level cache redirection, and compression and decompression of data.

User space 302 is a memory area or portion of the operating system used by user mode applications or programs otherwise running in user mode. A user mode application may not access kernel space 304 directly and uses service calls in order to access kernel services. User space 302 may include graphical user interface (GUI) 310, a command line interface (CLI) 312, shell services 314, health monitor 316, and daemon services 318. GUI 310 and CLI 312 enable a system administrator or other user to interact with and control the operation of appliance 220, such as via the operating system of appliance 220. Shell services 314 include the programs, services, tasks, processes or executable instructions to support interaction with appliance 220 by a user via the GUI 310 and/or CLI 312.

Health monitor 316 monitors, checks, reports and ensures that network systems are functioning properly and that users are receiving requested content over a network, for example by monitoring activity of appliance 220. In some embodiments, health monitor 316 intercepts and inspects any network traffic passed via appliance 220. For example, health monitor 316 may interface with one or more of encryption engine 324, cache manager 322, policy engine 326, compression engine 328, packet engine 340, daemon services 318, and shell services 314 to determine a state, status, operating condition, or health of any portion of the appliance 220. Further, health monitor 316 may determine if a program, process, service or task is active and currently running, check status, error or history logs provided by any program, process, service or task to determine any condition, status or error with any portion of appliance 220. Additionally, health monitor 316 may measure and monitor the performance of any application, program, process, service, task or thread executing on appliance 220.

Daemon services 318 are programs that run continuously or in the background and handle periodic service requests received by appliance 220. In some embodiments, a daemon service may forward the requests to other programs or processes, such as another daemon service 318 as appropriate.

As described herein, appliance 220 may relieve servers 195 of much of the processing load caused by repeatedly opening and closing transport layer connections to clients 165 by opening one or more transport layer connections with each server 195 and maintaining these connections to allow repeated data accesses by clients via the Internet (e.g., "connection pooling"). To perform connection pooling, appliance 220 may translate or multiplex communications by modifying sequence numbers and acknowledgment numbers at the transport layer protocol level (e.g., "connection multiplexing"). Appliance 220 may also provide switching or load balancing for communications between the client 165 and server 195.

As described herein, each client 165 may include client agent 240 for establishing and exchanging communications with appliance 220 and/or server 195 via a network 170. Client 165 may have installed and/or execute one or more applications that are in communication with network 170. Client agent 240 may intercept network communications from a network stack used by the one or more applications. For example, client agent 240 may intercept a network communication at any point in a network stack and redirect the network communication to a destination desired, managed or controlled by client agent 240, for example to intercept and redirect a transport layer connection to an IP address and port controlled or managed by client agent 240. Thus, client agent 240 may transparently intercept any protocol layer below the transport layer, such as the network layer, and any protocol layer above the transport layer, such as the session, presentation or application layers. Client agent 240 can interface with the transport layer to secure, optimize, accelerate, route or load-balance any communications provided via any protocol carried by the transport layer.

In some embodiments, client agent 240 is implemented as an Independent Computing Architecture (ICA) client developed by Citrix Systems, Inc. of Fort Lauderdale, Fla. Client agent 240 may perform acceleration, streaming, monitoring, and/or other operations. For example, client agent 240 may accelerate streaming an application from a server 195 to a client 165. Client agent 240 may also perform end-point detection/scanning and collect end-point information about client 165 for appliance 220 and/or server 195. Appliance 220 and/or server 195 may use the collected information to determine and provide access, authentication and authorization control of the client's connection to network 170. For example, client agent 240 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Performing Header Protection

A device intermediary to a plurality of clients and a plurality of servers can perform or provide header protection (e.g., REFERER header protection) to protect the servers from malicious attacks or bad actors attempting to fraudulently access the server or resources provided through the server. The device can determine to provide access or prevent access to a requested resource based in part on an address of the resource the request originated from and an address of a resource requested in the subsequent request. For example, the device can determine to provide access or prevent access to the requested resource responsive to an address of a first resource that the request originated from being included in an access list maintained by the device and the address of the requested resource indicated in the subsequent request being mapped to the address of the first resource on a mapping list maintained by the device.

A session can be established between a device and a client in response to a request from the client for a first resource. The device can generate a session identifier for the session to uniquely identify the session and to track subsequent requests received from the client during the session. The device can receive the requested first resource, for example, from a server and provide the first resource and the session identifier to the client. The device can generate an access list indicating resources accessed by the client during the session and include the requested first resource in the access list. The first resource can include one or more addresses (e.g., URLs, links) to access additional resources of the server. In embodiments, for each address, the device can generate a unique identifier and map the respective address to the original resource in a mapping list maintained by the device. The device can track and monitor subsequent requests from the client received via the addresses of the first resource to determine whether to provide access or deny access to the requested resource. For example, the device can receive a subsequent request for a second resource via an address of the first resource. The subsequent request can include the session identifier for the session between the client and the device and indicate address information for the first resource and the currently requested second resource. The device can retrieve the access list and mapping list created for the session to determine if the address of the first resource that the subsequent request originated from is included on the access list and the mapping list. In embodiments, if the address of the first resource that the subsequent request originated from is included on the access list and the mapping list, the device can verify that the address of the currently requested second resource is mapped with the address of the first resource that the subsequent request originated from in the mapping list. The device can determine to provide the client access to the currently requested second resource if the address of the second resource is mapped with the address of the first resource that the subsequent request originated from in the mapping list. In some embodiments, the device can determine to deny or prevent the client from accessing the currently requested second resource if the address of the second resource is not mapped with the address of the first resource that the subsequent request originated from in the mapping list. Thus, the device can use the address of the first resource that a subsequent request originated from and the address of a currently requested resource to protect servers from malicious or fraudulent attempts to access resources and/or data provided or hosted by the server. The device can use the access list and mapping list to provide multiple layers of security and protection against malicious attacks intended for resources of servers monitored by the device.

Figure 4:
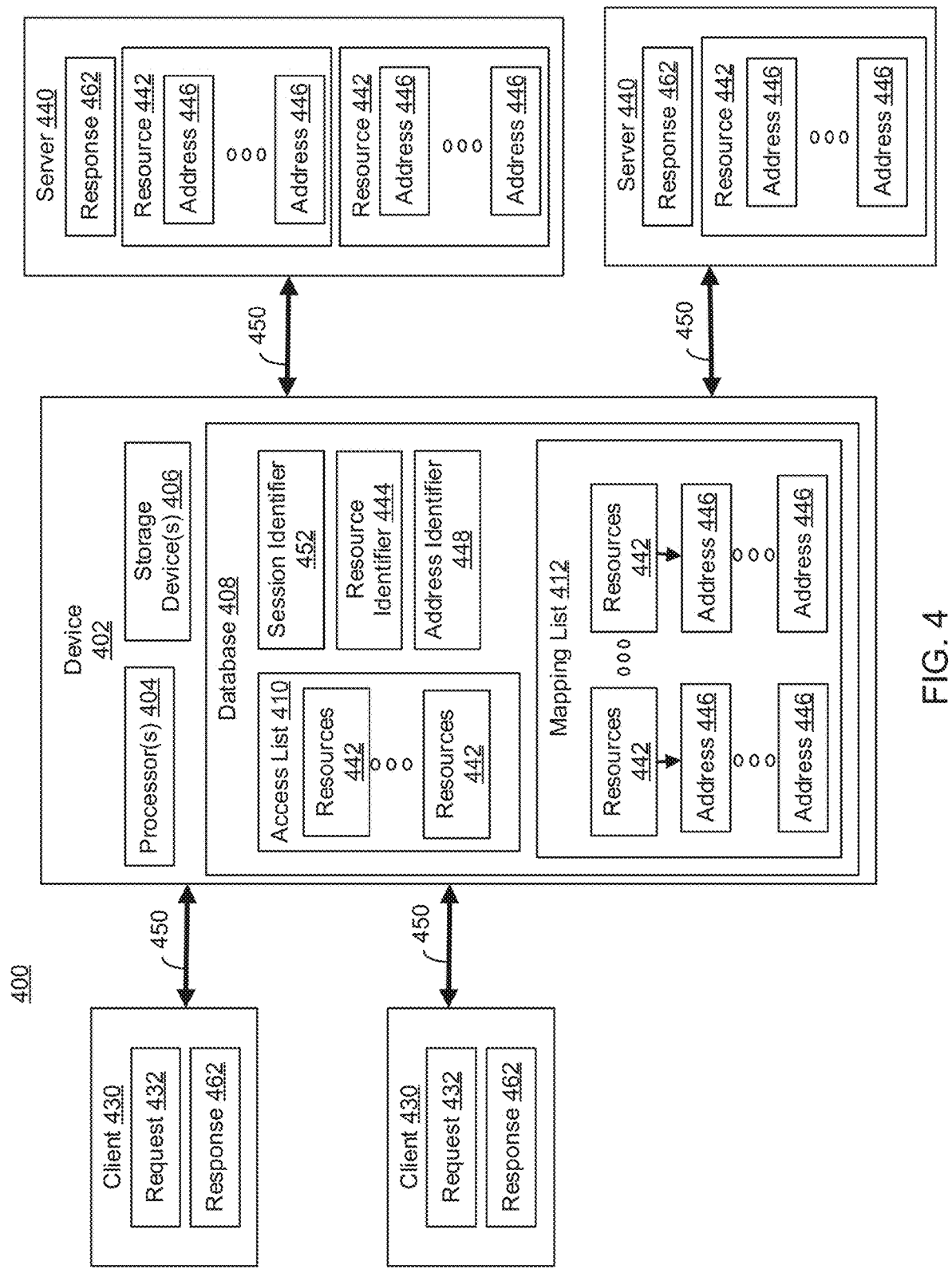
FIG. 4 is a block diagram of a system for performing header protection in distributed systems in accordance with an illustrative embodiment.

Referring to FIG. 4, depicted is a block diagram of one embodiment of an environment 400 having a device 402 (e.g., application delivery controller) for performing header protection in a distributed system that includes one or more clients 430 requested or accessing resources 442 of a plurality of servers 440. The device 402 can include or correspond to an application delivery controller deployed or executing in environment 400 to monitor and protect the plurality of servers 440 and resources 442 provided by the servers 440 from malicious or fraudulent attempts to access resources 442 and/or data provided or hosted by the servers 440. In embodiments, the device 402 can be intermediary to the clients 430 and the servers 440 to receive, process and manage requests 432 from the clients 430 for the resources 442 (e.g., web applications, one or more applications 470 and/or servers. The device 402 can perform load balancing of the resources 442 to process requests 432 from clients 430, act as a proxy or access server to provide access to the one or more resources 442, provide security and/or act as a firewall between the clients 430 and the servers 440 and/or resources 442 and/or provide encryption and decryption operations.

The device 402 can be implemented using hardware or a combination of software and hardware. For example, each component of the device 402 can include logical circuitry (e.g., a central processing unit or CPU) that responses to and processes instructions fetched from a memory unit (e.g., storage device 406). Each component of the device 402 can include or use a microprocessor or a multi-core processor. A multi-core processor can include two or more processing units (e.g., processor 404) on a single computing component. Each component of the device 402 can be based on any of these processors, or any other processor capable of operating as described herein. Each processor can utilize instruction level parallelism, thread level parallelism, different levels of cache, etc. For example, the device 402 can include at least one logic device such as a computing device or server having at least one processor 404 to communicate. The components and elements of the device 402 can be separate components or a single component. The device 402 can include a memory component (e.g., storage device 406, database 408) to store and retrieve data (e.g., data records 420, profiles 414). The memory can include a random access memory (RAM) or other dynamic storage device, coupled with the storage device 406 for storing information, and instructions to be executed by the device 402. The memory can include at least one read only memory (ROM) or other static storage device coupled with the storage device 406 for storing static information and instructions for the device 402. The memory can include a storage device 406, such as a solid state device, magnetic disk or optical disk, to persistently store information and instructions. The device 402 can be the same as or substantially similar to computer 100 of FIG. 1A or appliance 220 of FIGS. 2A, 2B and 3.

The device can include a database 408 to store and maintain an access list 410 and a mapping list 412. The database 408 can be the same as or substantially similar to storage device 406. The database 408 can be a component of the device 402. In some embodiments, the database 408 can be remote from the device 402 and the device 402 can be connected to the database 408 through environment 400 to store and maintain data associated with requests 432 from clients 430, identifiers 444 for resources 442, identifiers 448 for addresses 446, access lists 410 and mapping lists 412.

The access list 410 can include a listing or a database having a plurality of entries to store and maintain information corresponding to resources 442 accessed by clients 430 during one or more sessions 450. An access list 410 can be unique to a session 450. For example, the device 402 can create at least one access list 410 for each session 450 initiated between the device 402 and one or more clients 430. The access list 410 can include a plurality of entries with each entry including information for at least one resource 442 accessed by a client 430 during a session 450. Accessed as used herein can include, but not limited to, a client 430 interacting with the resource 442, interacting with an address 446 (e.g., link) of the respective resource 442, the client 430 executing the resource 442 via a server 440 and/or the client 430 executing the resource 442 via a component of the client 430. The access list 410 can include a plurality of entries with details or properties of an accessed resource 442 and the details or properties can include, but not limited to, an address 446 (e.g., URL) of the resource 442, an identifier 444 for the resource 442, a name or title of the resource 442, and a server 440 providing the resource 442. In embodiments, the device 402 can tag or mark a resource 442 in the access list 410 to indicate that the respective resource 442 has been seen or accessed by the client 430 during a session 450 and add the identifier 444 for the resource 442 to the access list 410. In some embodiments, the device 402 can add the address 446 of the requested resource 442, the identifier 444 of the requested resource 442 and the requested resource 442 to the access list 410 to the entry in the access list 410 for the respective resource 442. The device 402 can maintain the access list 410 for the duration of the session 450. In embodiments, the device 402 can update or modify the access list 410 responsive to providing the client 430 access to one or more subsequent or additional resources 442 during the session 450.

The mapping list 412 can include a listing or a database having a plurality of entries to store and maintain information corresponding to resources 442 mapped to other resources 442 and/or resources 442 mapped to addresses 446 included with the respective resource 442. The mapping list 412 can be used to associate or link resources 442 with URLs embedded within or included with the respective resource 442. The device 402 can create at least one mapping list 412 for each session 450 such that the mapping list 412 is unique to the respective session 450 and active when the respective session 450 is active. The mapping list can include a plurality of entries with each entry including information for at least one resource 442 accessed by a client 430 during a session 450 and one or more addresses 446 included with the respective resource 442. For example, the device 402 can map addresses 446 included with a resource 442 to the respective resource 442 in the mapping list to determine whether subsequent requests 432 received using the addresses 446 are originated from a valid resource 442 (e.g., resource included in the mapping list or are fraudulent or malicious attempts to access a resource 442 using the respective address 446. In embodiments, a valid resource 442 can include an approved resource 442 and/or a resource 442 identified in an access list 410 and identified in a mapping list 412.

In some embodiments, an entry of the mapping list 412 can include the identifier 444 for the first resource 442 and an identifier 448 for each address 446 (e.g., URL, link) embedded within the first resource 442 or associated with the first resource 442. The mapping list 412 can include or correspond to a 1:N mapping such that a single resource 442 can be mapped to a plurality of addresses 446 (e.g., one URL can be part of many responses or requests to access additional resources through the first web page). The data of the mapping can be global and generated such that the "key" is or corresponds to the identifier 444 of the first resource 442 and the 'value' is the set of identifiers 448 for the addresses 446 of the resource 442 (e.g., set of URL IDs). In one embodiments, the entry of the mapping list 412 can include, but not limited to, a resource identifier 444: {first address identifier 448, second address identifier 448, . . . , Nth address identifier 448 (e.g., URL_ID: {URL_ID1, URL_ID2, . . . , URL_IDN}). The device 402 can maintain the mapping list 412 for the duration of the session 450. In embodiments, the device 402 can update or modify the mapping list 412 responsive to providing the client 430 access to one or more subsequent or additional resources 442 during the session 450.

The servers 440 can include software, hardware or a combination of software and hardware to host, provide or execute one or more resources 442. The servers 440 can include or deployed as, and/or be executed on any type and form of computing device, such as any desktop computer, laptop computer, or mobile device capable of communication over at least one network and performing the operations described herein. For example, servers 440 can include or correspond to one computer, a plurality of computers, or a network of distributed computers such as computer 100 shown in FIG. 1A or servers 195 of FIG. 1B, 2A, 2B.

In embodiments, servers 440 can host or provide one or more resources 442. The resources 442 can include applications, web pages, services, desktops, and/or files. In embodiments, the resources 442 can include hosted applications, Software as a Service (SaaS) applications, virtual desktops, virtual applications, web applications, mobile applications, and other forms of content. In some embodiments, the resources 442 can include or correspond to applications provided by remote servers 440 or third party servers 440. The device 402 can generate and assign a resource identifier 444 to a resource 442, for example, responsive to the resource 442 being accessed by a client 430. The resource identifier 444 can be unique to the respective resource 442 and used to identify the resource 442 in one or more lists or databases maintained by the device 402 and/or track subsequent requests 432 received through the respective resource 442. In embodiments, the device 402 can convert an address (e.g., URL) or path name of the resource 442 to create the identifier 444. The identifier 444 can include numerals, alphanumeric characters, punctuation characters, symbols and any combination of numerals, alphanumeric characters, punctuation characters, and symbols.

The resources 442 can include one or more addresses 446. Addresses 446 as used herein can refer to a uniform resource locator (URL), a link to a resource 442, an address of the resource 442, a reference to a resource 442 that indicates the resources 442 location on a computer network (e.g., environment 400) and a mechanism for retrieving or accessing the resource 442. The addresses 446 can include, but not limited to, embedded links or hyperlinks included within or as part of a resource 442 that indicate or point to a subsequent or additional resource 442. In embodiments, the resources 442 can include one or more addresses 446 that refer to or point to additional resources 442 such that response to an interaction (e.g., click on, tap, hover over), the address 446 can cause a client 430 to generate and transmit a request 432 for the respective additional resource 442. The request 432 can identify the resource 442 (e.g., originating resource) that the request 432 originated from and the additional resource 442 the client 430 seeks to access.

The device 402 can generate and assign a address identifier 448 to an address 446, for example, responsive to the address 446 being identified in a resource 442 accessed by a client 430. The address identifier 448 can be unique to the respective address 446 and used to identify the address 446 in one or more lists or databases maintained by the device 402 and/or track subsequent requests 432 received using the respective address 446. In embodiments, the device 402 can convert an address (e.g., URL) or path name of the address 446 to create the address identifier 448. The address identifier 448 can include numerals, alphanumeric characters, punctuation characters, symbols and any combination of numerals, alphanumeric characters, punctuation characters, and symbols.

The clients 430 (e.g., client devices) can include, but not limited to a computing device or a mobile device. The clients 430 can include or correspond to an instance of any client device, mobile device or computer device described herein. For example, the clients 430 can be the same as or substantially similar to computer 100 of FIG. 1A or clients 165 of FIG. 1B, 2A, 2B. The clients 430 can establish a session 450 to the device 402, for example, to access one or more resources 442 hosted by or provided by the plurality of servers 440. For example, a client 430 can generate and transmit a request 432 to access at least one resource 442. The request 432 can include an, but is not limited to, a HTTP request and can identify a type of resource 442, the resource 442, and/or a server 440. In embodiments, the request 432 can include a header or header portion that includes an identifier 452 (e.g., cookies) of a current or active session 450 between the client 430 and the device 402. The header of the request 432 can include an identifier 444 of a resource 442 that the request 432 originated from, for example, for subsequent requests 432 generated responsive to an interaction with a first or initial resource 442 provided to the client 430. The header of the request 432 can include an identifier 448 of an address 446 used to generate a request 432, responsive to an interaction with the respective address 446.

The device 402 can create or establish sessions 450 to one or more clients 430 to monitor requests 432 from the clients 430 for one or more resources 442 of the servers 440. The device 402 can use the sessions 450 to monitor and protect the plurality of servers 440 and resources 442 provided by the servers 440 from malicious or fraudulent attempts to access resources 442 and/or data provided or hosted by the servers 440. The sessions 450 can include a channel or connection between a client 430 and the device 402, between the device 402 and a server 440 and/or between a client 430 and a server 440. The sessions 450 can correspond to or be used to establish an application session (e.g., virtual application), an execution session, a desktop session, a hosted desktop session, a terminal services session, a browser session, a remote desktop session, a URL session and/or a remote application session. The sessions 450 can include encrypted and/or secure sessions established between the device 402 and a client 430. The encrypted session 450 can include an encrypted file, encrypted data or traffic transmitted between the device 402 and a client 430.

In embodiments, the device 402 can assign the session 450 a timeout interval such that in response to the client 430 being idle (e.g., no requests, no activity, no user interaction with one or more resources 442) for the determined timeout interval, the device ends the session 450 between the client 430 and the device 402. The device 402 can create and assign a session identifier 452 to the session 450. The session identifier 452 can be unique to the respective session 450. The device 402 can use the session 450 and the session identifier 452 to track and monitor requests 432 received from the client 430 during the respective session 450. The session identifier 452 can include numerals, alphanumeric characters, punctuation characters, symbols and any combination of numerals, alphanumeric characters, punctuation characters, and symbols. In some embodiments, the session identifier 452 can include cookies or session cookies established when the device 402 establishes the session 450 between the client 430 and the device 402.

The environment 400 can include a cloud environment, region, or an availability zone. In embodiments, the environment 400 can include a cloud region, a provider region or a geographic region or location where the cloud resources are located. The environment 400 can include a geographic region or location one or more data centers serving the device 402 and/or servers 440 are located. The environment 400 can include a logical data center in a region available for use by the device 402 and one or more servers 440. In embodiments, the environment 200 can be the same as or substantially similar to computing environment 160, network 170 or cloud 175 of FIG. 1B.

Each of the above-mentioned elements or entities is implemented in hardware, or a combination of hardware and software, in one or more embodiments. Each component of the device 402 may be implemented using hardware or a combination of hardware or software detailed above in connection with FIGS. 1A-3. For instance, each of these elements or entities can include any application, program, library, script, task, service, process or any type and form of executable instructions executing on hardware of a device (e.g., device 402). The hardware includes circuitry such as one or more processors in one or more embodiments.

Figure 5:
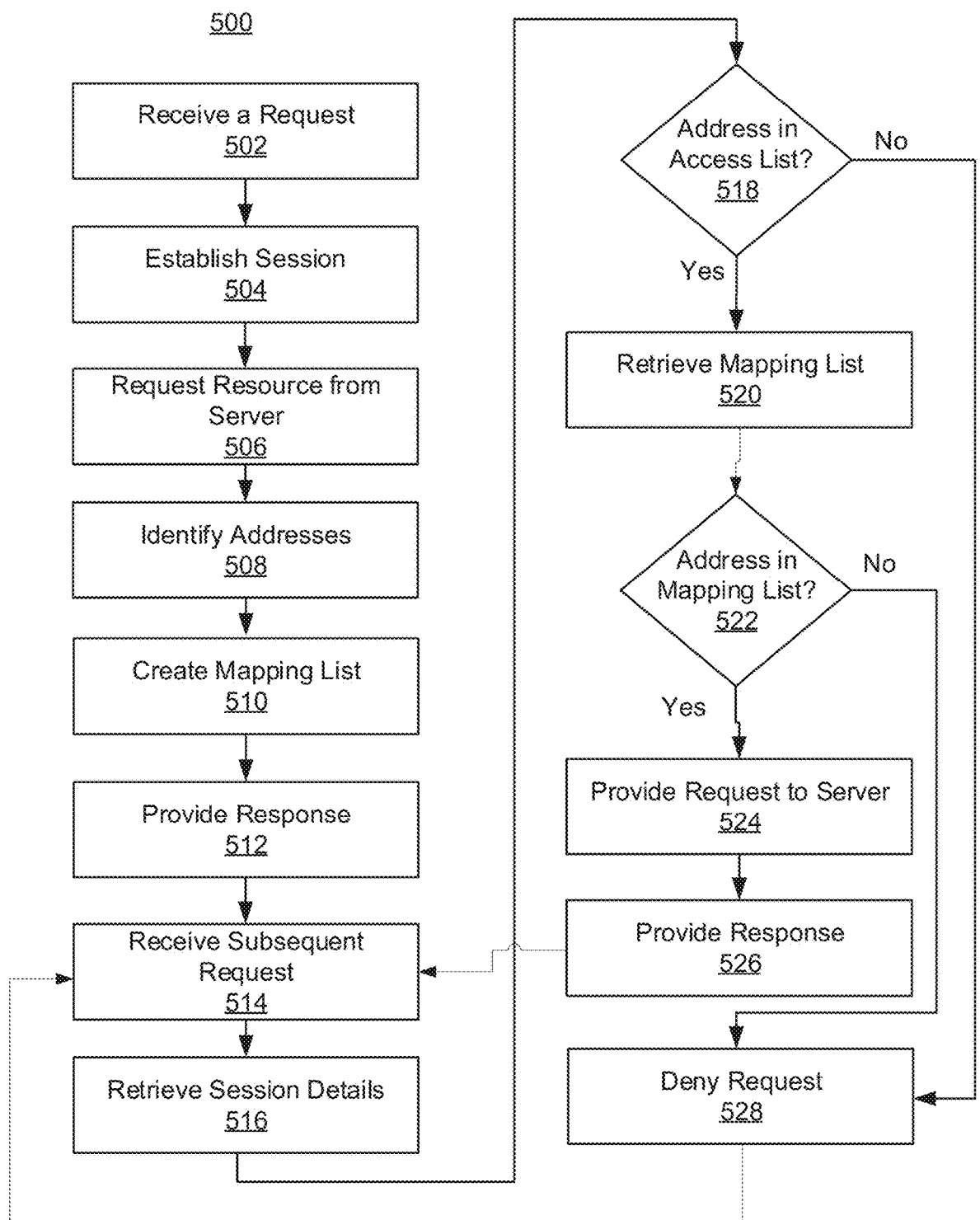
FIG. 5 is a flow diagram of a method for performing header protection in distributed systems, in accordance with an illustrative embodiment.

Referring now to FIG. 5, depicted is a flow diagram of one embodiment of a method 500 for performing header protection. In brief overview, the method 500 can include one or more of: receiving a request (502), establishing a session (504), requesting a resource from a server (506), identifying addresses (508), creating a mapping list (510), providing a response (512), receiving a subsequent request (514), retrieving session details (516), determining whether an address is included in an access list (518), retrieving a mapping list (520), determining whether an addresses is included in the mapping list (522), providing the subsequent request to the server (524), providing a response (526), and denying the request (528). The functionalities of the method 500 may be implemented using, or performed by, the components detailed herein in connection with FIGS. 1A-4.

Referring now to operation (502), and in some embodiments, a request 432 can be received. A device 402 intermediary to a plurality of clients 430 and a plurality of servers 440 can receive a request 432 for a resource 442 provide by or hosted by at least one server 440. In embodiments, the device 402 can include an application delivery controller (ADC) to provide resources 442 (e.g., applications) of one or more servers 440 to one or more clients 430 and/or perform load balancing for sessions 450 between the plurality of clients 430 and the plurality of servers 440. The request 432 can include an HTTP request and can identify a type of resource 442, a resource 442, and/or a server 440 the client 430 wants to access. In embodiments, the request 432 can include or correspond to an initial or first request 432 from the client 430, for example, prior to a session (e.g., active session, current session) being created between the client 430 and the device 402.

Referring now to operation (504), and in some embodiments, a session 450 can be created. The device 402 can create or establish a session 450 (e.g., client session) for the client 430 responsive to an initial or first request 432 from the client 430 for a first or initial resource 442. For example, the first request 432 can be received prior to an active session 450 existing between the client 430 and the device 402. During the request processing, the device 402 can determine that an active session 450 for the client 430 does not exist and establish a session 450 between the client 430 and the device 402 to access one or more resources 442 of the plurality of servers 440.

The device 402 can generate or create a session identifier 452 for the session 450 between client 430 and the device 402 to track subsequent requests 432 relating to or originating from the first resource 442 during the session 450. In embodiments, the device 402 can assign the session 450 a timeout interval such that in response to the client 430 being idle (e.g., no requests, no activity, no user interaction with one or more resources 442) for the determined timeout interval, the device ends the session 450 between the client 430 and the device 402. The session 450 and the session identifier 452 can be valid for the duration of the timeout interval of the session 450 or until the client 430 ends the session 450. The device 402 can use the session 450 and the session identifier 452 to track and monitor requests 432 received from the client 430 during the respective session 450. For example, the device 402 can use the session 450 and the session identifier 452 to track and monitor addresses 446 (e.g., URLs) accessed by the client or attempting to access by the client 430 during the respective session 450. In some embodiments, the device 402 can create multiple sessions 450 to a client 430, for example, in response to requests 432 for multiple resources 442. The device 402 can create multiple sessions 450 to a client 430 in response to requests 432 for resources 442 provided by different servers 440. In embodiments, the device 402 can create a session 450 for each new resource 442 not linked, mapped or associated with at least one other resource 442 requested by a client 430. In embodiments, each session 450 can be assigned a unique or different session identifier 452.

The device 402 can create a unique identifier 444 for the resource 442 (e.g., first resource) requested by the client 430. The resource identifier 444 can be used to identify the resource 442 in one or more lists or databases maintained by the device 402 and/or track subsequent requests 432 received through the respective resource 442. In embodiments, the device 402 can convert an address (e.g., URL) or path name of the resource 442 to create the resource identifier 444. The identifier 444 can include numerals, alphanumeric characters, punctuation characters, symbols and any combination of numerals, alphanumeric characters, punctuation characters, and symbols.

The device 402 can create an access list 410 for the session 450. The device 402 can dynamically create the access list 410, for example, responsive to creating a session 450 between a client 430 and the device 402. In embodiments, an access list 410 can be created for each session 450 such that the access list 410 is unique to the respective session 450 and active when the respective session 450 is active. The access list 410 can identify one or more resources 442 accessed by the client 430 during the session 450. In embodiments, the device 402 can create an access list 410 for each client 430 and/or for each session 450 established between a client 430 and the device 402. The access list 410 can include a plurality of entries with details or properties of an accessed resource 442 entered into at least one entry of the access list 410. The details or properties of an accessed resource 442 can include, but not limited to, an address (e.g., URL) of the resource, an identifier 444 for the resource, a name or title of the resource 442, and a server 440 providing the resource 442.

The device 402 can tag or mark the resource 442 (e.g., first resource) requested by the client 430 as seen or access and add the identifier 444 for the resource 442 to the access list 410. In some embodiments, the device 402 can add the address 446 of the requested resource 442, the identifier 444 of the requested resource 442 and the requested resource 442 to the access list 410 to an entry in the access list 410 for the respective resource 442. The device 402 can maintain the access list 410 for the duration of the session 450. In embodiments, the device 402 can update or modify the access list 410 responsive to providing the client 430 access to a resource 442 during the session 450. For example, the access list 410 can include a dynamic list that is updated as a client 430 accesses additional resources 442 during a session 450.

Referring now to operation (506), and in some embodiments, a resource 442 can be requested from a server 440. The device 402 can identify a server 440 of the plurality of servers 440 that provides or hosts the requested first resource 442 and transmit a request to the identified server 440 for the requested first resource 442. In some embodiments, the device 402 can forward or provide the request 432 (e.g., HTTP request) from the client 430 to the server 440 identifying the resource 442. The device 402 can receive a response 462 (e.g., HTTP response) from the server 440 including the requested resource 442 or an address 446 to access the requested resource 442. The response 462 or received first resource 442 can include one or more addresses 446 (e.g., URLs) to access one or more additional or other resources 442 through the first resource or initial resource 442. For example, first resource 442 can include a first web page of a web site and include one or more URLs 446 embedded within the first resource 442 or included with the first resource 442 to access additional resources 442 (e.g., second resource, subsequent resource), such as but not limited to a web page within the same website as the first resource 442.

Referring now to operation (508), and in some embodiments, one or more addresses 446 can be identified. The device 402 can receive from the server 440 the first resource including one or more addresses 446. The device 402 can determine or identify the one or more addresses 446 included with the first resource 442. In embodiments, each of the addresses 446 can enable or provide access to a different resource 442. For example, the device 402 can parse the response 462 to determine and identify the number of addresses 446 included with the first resource 442. For each identified address 446, the device 402 generates a unique identifier 448 included with the first resource 442. For example, in some embodiments, the device 402 can parse an HTTP response 462 and identify one or more URLs (e.g., addresses 446) included with the HTTP response 462. The device 402 can create a unique identifier 448 for the URLs (e.g., addresses 446) included with the HTTP response 462. In embodiments, the device 402 can convert address information or a pathname of an address 446 to create the address identifier 448. The identifier 448 for an address 446 can include numerals, alphanumeric characters, punctuation characters, symbols and any combination of numerals, alphanumeric characters, punctuation characters, and symbols.

Referring now to operation (510), and in some embodiments, a mapping list 412 can be created. The device 402 can create an mapping list 412 for the session 450. In embodiments, the mapping list 412 can be dynamically created by the device 402 for the session 450 responsive to creating the respective session 450 between a client 430 and the device 402. At least one mapping list 412 can be created for each session 450 such that the mapping list 412 is unique to the respective session 450 and active when the respective session 450 is active.

The device 402 can map the address 446 or identifier 444 of the first resource 442 to each identifier 448 of each address 446 in a list (e.g., mapping list 412) indicating addresses 446 approved for access by the client 430 responsive to requests 432 relating to the first resource (e.g., requests 432 originating from the first resource 442 or originating resource 442). The device 402 can map addresses 446 included with a resource 442 (e.g., first resource) to the respective resource 442 to determine whether subsequent requests received using the addresses 446 are originated from a valid resource 442 or are fraudulent or malicious attempts to access a resource 442 using the respective address 446. For example, the device 402 can map each address 446 included with a resource 442 or associated with the resource 442 to the respective resource 442 using the identifiers 448 for the addresses 446 and the identifier 444 for the resource 442. In some embodiments, an entry of the mapping list 412 can include the identifier 444 for the first resource 442 and an identifier 448 for each address 446 embedded within the first resource 442 or associated with the first resource 442. The mapping list 412 can include or correspond to a 1:N mapping such that a single resource 442 can be mapped to a plurality of addresses 446 (e.g., one URL can be part of many responses or requests to access additional resources through the first web page). The data of the mapping can be global and generated such that the "key" is or corresponds to the identifier 444 of the first resource 442 and the 'value' is the set of identifiers 448 for the addresses 446 of the first resource 442 (e.g., set of URL IDs). In one embodiments, the entry of the mapping list 412 can include, but not limited to, first resource identifier 444: {first address identifier 448, second address identifier 448, . . . , Nth address identifier 448 (e.g., URL_ID: {URL_ID1, URL_ID2, . . . , URL_IDN}). The device 402 can maintain the mapping list 412 for the duration of the session 450. In embodiments, the device 402 can update or modify the mapping list 412 responsive to providing the client 430 access to a resource 442 during the session 450.

Referring now to operation (512), and in some embodiments, a response 462 can be provided. The device 402 can provide or forward the response 462 (e.g., HTTP response)

to the client 430. The response 462 can include the first resource 442 or an address 446 to access the first resource 442 and the session identifier 452 for the session 450 between the client 430 and the device 402. In embodiments, the device can include or insert the session identifier 452 into a header of the response 462 such that subsequent requests 432 received through the first resource 442 can include the session identifier 452. In one embodiments, the device 402 can transmit the response 462 to the client 430 and include a 'set.cookie' header to include the session identifier 452 (e.g., cookies) into a header portion of the response 462 to cause or instruct the client 430 or agent executing on the client 430 to transmit the session identifier 452 for subsequent requests 432 received from the client 430 via one or more addresses 446 of the first resource 442. The device 402 can provide to the client 430 the first resource 442 including one or more addresses 446 linked to other resources 442 associated with the first resource 442 and the identifier 452 for the session 450 between the client 430 and the device 402.

Referring now to operation (514), and in some embodiments, a subsequent request 432 can be received. The device 402 can receive, from a client 430, a request for a second resource 442 and the request 432 can originate from a first resource 442. The request 432 can include an identifier 452 of a session 450 (e.g., current session) between the client 430 and the device 402. For example, the device 402 can receive a second or subsequent request 432 from the client 430 during the session 450 through an address 446 (e.g., URL) of the first resource 442. The device 402 can receive the subsequent request 432 responsive to an interaction with the address 446 (e.g., user interaction, click on, select) provided through the first resource 442 (e.g., URL in a web page of the first resource). For example, in embodiments, the device 402 can receive the subsequent request from the client 430 during the session 450 through an interaction with at least one address 446 (e.g., URL) included within or embedded within a web page of the first resource 442. The subsequent request 432 can originate from the first resource 442 and causes the client 430 to generate and transmit the subsequent request 432 to the device 402 including the session identifier 452, identifying the first resource 442 the subsequent request originated from and identifying a requested second resource 442. In some embodiments, the session identifier 452 (e.g., cookies) can be included a header of the subsequent request 432 to the device 402.

Referring now to operation (516), and in some embodiments, session details can be obtained. The device 402 can obtain or retrieve, using the session identifier 452, details for the session 450 between the client 430 and the device 402. The details can include a first list 410 (e.g., access list 410) indicating one or more addresses 446 accessed by the client 430 during the session 450 and a second list 412 (e.g., mapping list 412) indicating addresses 446 or identifiers 444 mapped to one or more other addresses 446 or identifiers 444 and approved for the client 430 to access during the session 450. The device 402 can extract or retrieve the session identifier 452 from the subsequent request 432, for example, through a header of the subsequent request 432. The device 402 can validate or determine if the session identifier 452 included with the subsequent request 432 is a valid request 432, for example, for an active or current session 450. To validate the session identifier 452, the device 402 can compare the session identifier 452 to a listing of identifiers 452 for active or current sessions 450 to the device. If the session identifier 452 is included within the listing of identifiers 452 for active or current sessions 450 to the device 402, the device 402 can determine the session identifier 452 is valid. If the session identifier 452 is not included within the listing of identifiers 452 for active or current sessions 450 to the device 402, the device 402 can determine the session identifier 452 is invalid or fraudulent. If the session identifier 452 included with the request is invalid or fraudulent, the method 500 can move to (528) to deny the subsequent request 432.

If the session identifier 452 is valid, the device 402 can use the session identifier 452 to identify and retrieve the session details and data for the session 450 between the client 430 and the device 402. The session details can include, but not limited to, an access list 410 for the session 450 and a mapping list 412 for the session 450. In some embodiments, the device 402 can use the session identifier 452 to identify an entry in a database 408 of the device 402 corresponding the session 450 and retrieve the access list 410 for the session 450 from the database.

Referring now to operation (518), and in some embodiments, a determination can be made if the address 446 of the resource 442 that the subsequent request 432 originated from is included in the access list 410. The device 402 can determine, using the session identifier 452, whether the address 446 of the first resource 442 (e.g., originating resource) is included in a list 410 (e.g., first list, access list) indicating addresses 446 previously accessed by the client 430 during the session 450. In embodiments, the device 402 can determine, using the session identifier 452, whether an address 446 of the first resource 442 has been previously accessed by the client 430 during the session 450. The device 402 can use the session identifier 452 to obtain the address 446 of the resource 442 that the subsequent request 432 originated from. In some embodiments, the device 402 can identify or obtain the address 446 of the resource 442 from the header of the subsequent request 432. The device 402 can compare the address 446 of the resource 442 to one or more addresses 446 included in the access list to determine if the made if the address 446 of the resource 442 that the subsequent request 432 originated from is included in the access list 410.

If the address 446 of the resource 442 that the subsequent request 432 originated from is included in the access list 410, the method 500 can move to (520) to obtain the mapping list 412. If the address 446 of the resource 442 that the subsequent request 432 originated from is not included in the access list 410, the method 500 can move to (528) to deny the subsequent request 432.

Referring now to operation (520), and in some embodiments, the mapping list 412 can be obtained. The device 402 can use the session identifier 452 to identify and retrieve the session details and data for the session 450 between the client 430 and the device 402. The session details can include, but not limited to, an access list 410 for the session 450 and a mapping list 412 for the session 450. In some embodiments, the device 402 can use the session identifier 452 to identify an entry in a database 408 of the device 402 corresponding the session 450 and retrieve the access list 410 for the session 450 from the database.

Referring now to operation (522), and in some embodiments, a determination can be made if the address 446 of the resource 442 the subsequent request 432 originated from is included in the mapping list 412. The device 402 can determine whether the address 446 or identifier 444 of the second resource 442 is mapped to the address 446 or identifier 444 of the first resource 442 in a list (e.g., second list, mapping list) indicating addresses 446 and/or identifiers 444 previously mapped by the device 402 for access by the client 430 during the session 450. For example, the device 402 can use the session identifier 452 to obtain the address 446 of the resource 442 that the subsequent request 432 originated from. In some embodiments, the device 402 can identify or obtain the address 446 of the resource 442 from the header of the subsequent request 432.

The device 402 can compare the address 446 of the first resource 442 or originating resource 442 to one or more addresses 446 included in the mapping list 412 to determine if the address 446 of the originating resource 442 is included in the mapping list 412. In some embodiments, the device 402 can compare the resource identifier 444 of the first resource 442 or originating resource 442 to one or more resource identifiers 444 included in the mapping list 412 to determine if the originating resource 442 is included in the mapping list 412. If the address 446 or resource identifier 444 for the originating resource 442 is included in the mapping list 412, the device 402 can determine if the second resource 442 or requested resource 442 is mapped to the originating resource 442 in the mapping list 412.

In embodiments, the device 402 can verify, using an address 446 of the second resource 442, whether the address 446 of the second resource 442 is mapped to the address 446 of the first resource 442 for the session 450 between the client 430 and the device 402. The device 402 can retrieve the mapping generated for the originated resource 442 and compare the address 446 of the second resource 442 or identified resource 442 to the addresses 446 mapped to the address 446 of the originating resource 442. The mapping list 412 can include one or more addresses 446 of resources 442 (or resource identifiers 444 of resources 442) that are mapped or linked to the originating resource 442 in at least one entry of the mapping list 412. In some embodiments, the device 402 can compare the resource identifier 444 of the second resource 442 or identified resource 442 to one or more resource identifiers 444 of resources 442 mapped to the originating resource 442. Based on the comparison, the device 402 can determine is the whether the address 446 or identifier 444 of the second resource 442 (e.g., second resource) is mapped to the address 446 or resource identifier 444 of the originating resource 442 (e.g., first resource) for the session 450 between the client 430 and the device 402.

The device 402 can determine whether to provide access to the second resource 442 or requested resource 442 responsive to the address 446 or identifier 444 of the first resource 442 being previously accessed by the client 430 during the session 450 and the address 446 or identifier 444 of the second resource 442 being mapped to the address 446 of the first resource 442 for the session 450. For example, the device 402 can use a multi-layer policy to protect the resources 442 from being inappropriately accessed or accessed by malicious actors. The device 402 can determine whether to provide access based in part on a first determination involving the access list 410 at (518) and a second determination involving the mapping list 412 at (522) to determine if the subsequent request 432 is a valid request 432 or a malicious request 432. If the address 446 or resource identifier 444 of the requested resource 442 (e.g., second resource) is mapped to the address 446 or resource identifier 444 of the originating resource 442 (e.g., first resource) for the session 450 between the client 430 and the device 402, the method 500 can move to (524) to continue processing the subsequent request 432. If the address 446 or resource identifier 444 of the requested resource 442 (e.g., second resource) is not mapped to the address 446 or resource identifier 444 of the originating resource 442 (e.g., first resource) for the session 450 between the client 430 and the device 402, the method 500 can move to (528) to deny or prevent the subsequent request 432.

Referring now to operation (524), and in some embodiments, the subsequent request 432 can be forwarded to the server 440. The device 402 can identify the server 440 of the plurality of servers 440 to transmit the subsequent request based in part on the resource 442 identified in the request 432. The device 402 can maintain a listing identifying the resources 442 hosted by or provided by the plurality of servers 440 and compare the requested resource 442 to the listing to identify the correct server 440 to provide the subsequent request 432. The device 402 can select the server 440 that provides or hosts the requested resource 442. In some embodiments, the device 402 can forward or provide the subsequent request 432 (e.g., HTTP request) from the client 430 to the server 440 identifying the resource 442.

The device 402 can receive a response 462 (e.g., HTTP response) from the server 440 including the requested resource 442 or an address 446 to access the requested resource 442. The response 462 or received resource 442 can include one or more addresses 446 (e.g., URLs) to access one or more additional or other resources 442 through the first resource or initial resource 442. For example, the resource 442 can include a web page of a web site and include one or more URLs 446 embedded within the resource 442 or included with the resource 442 to access additional resources 442 (e.g., subsequent resources), such as but not limited to a web page within the same website as the resource 442. In embodiments, the device 402 can parse the response 462 to determine and identify the number of addresses 446 included with the resource 442. For each identified address 446, the device 402 generates a unique identifier 448. In embodiments, the device 402 can convert address information or a pathname of an address 446 to create the identifier 448. The identifier 448 for an address 446 can include numerals, alphanumeric characters, punctuation characters, symbols and any combination of numerals, alphanumeric characters, punctuation characters, and symbols.

The device 402 can update the mapping list 412 for the session 450 to include the new or recently identified addresses 446 of the resource 442. The device 402 can map the new addresses 446 to the resource 442 that the addresses 446 are included with and/or map the new addresses 446 to the original or first resource 442 that initiated the session 450. The device 402 can dynamically update and modify the mapping list 412 as additional resources 442 are requested and retrieved from the plurality of servers 440 during the session 450 to include the addresses 446 included with each of the additional resources 442 provided to the client 430. In embodiments, the addresses 446 included with the additional resources 442 can be mapped to the original or first resource 442 that initiated the session 450 and/or the addresses 446 can be mapped to the respective resource 442 that the addresses 446 are included with. The device 402 can map addresses 446 included with the additional resources 442 to the first resource 442 to the respective resource 442 that the addresses 446 are included with to determine whether subsequent requests received using the respective addresses 446 are originated from a valid resource 442 (e.g., mapped resource) or are fraudulent or malicious attempts to access a resource 442 using the respective address 446. The device 402 can maintain and continually update the mapping list 412 as subsequent requests 432 are received and processed for the duration of the session 450 or while the session 450 is active.

Referring now to operation (526), and in some embodiments, a subsequent response 462 can be provided to the client 430. The device 402 can provide or enable access to the second resource 442 (e.g., requested resource) responsive to the address 446 of the first resource 442 being previously accessed by the client 430 during the session 450 and the address 446 or identifier 444 of the second resource 442 being mapped to the address 446 or identifier 444 of the first resource 442 for the session 450. The device 402 can provide or forward the response 462 (e.g., HTTP response) to the client 430 including the requested resource 442. In embodiments, the response 462 can include the requested resource 442 or an address to access the requested resource 442 and the session identifier 452 for the current session 450 between the client 430 and the device 402. The device 402 can include or insert the session identifier 452 for the current session 450 into a header of the response 462 such that subsequent requests 432 received through the resource 442 can include the session identifier 452. The session identifier 452 (e.g., cookies) can cause or instruct the client 430 or agent executing on the client 430 to transmit the session identifier 452 for subsequent requests 432 received from the client 430 via one or more addresses 446 of the resource 442.

Referring now to operation (528), and in some embodiments, the subsequent request 432 can be denied. The device 402 can deny or prevent the subsequent request 432 using different criteria or multiple criteria to provide different levels of protection to detect and prevent malicious requests 432 or malicious attacks intended for the plurality of servers 440 and/or resources 442 provided by the servers 440.

The device 402 can deny the request 432 (e.g., subsequent request) for the second resource 442 responsive to the address 446 of the first resource 442 (e.g., originating resource) being different from one or more addresses 446 previously accessed by the client 430 during the session 450 or the address 446 or identifier 444 of the second resource 442 not being mapped to the address 446 or identifier 444 of the first resource 442 for the session 450. For example, the device 402 can deny the subsequent request 432 if the address 446 of the resource 442 that the respective request 432 originated from is not included in the access list 410 and/or the mapping list 412. The device 402 can deny the subsequent request 432 responsive to determining that the address 446 of the resource 442 that the respective request 432 originated from is not mapped to the address 446 of the requested resource 442 (e.g., third resource 442) identified in the subsequent request 432 in the mapping list 412.

The device 402 can deny the subsequent request 432 responsive to determining that the address 446 of the resource 442 that the respective request 432 originated from is not included in the access list 410. The device can compare the address 446 of the resource 442 to one or more addresses 446 included in the access list 410 to determine if the address 446 of the resource 442 that the subsequent request 432 originated from is included in the access list 410. If the address 446 (e.g., URL, identifier) is not included in the access list 410, the device 402 can prevent or deny the subsequent request 432. In some embodiments, the device 402 can transmit a response 462 to the client 430 indicating that the subsequent request 432 has been denied.

The device 402 can deny the subsequent request 432 responsive to determining that the address 446 of the resource 442 that the respective request 432 originated from is not included in the mapping list 412. In embodiments, the device can compare the address 446 of the resource 442 to one or more addresses 446 included in the mapping list 412 to determine if the address 446 of the resource 442 that the subsequent request 432 originated from is included in the mapping list 412. The device can compare the identifier 444 generated for the resource 442 to one or more identifiers 444 included in the mapping list 412 to determine if the resource 442 that the subsequent request 432 originated from is included in the mapping list 412. If the address 446 or identifier 444 of the resource 442 is not included in the mapping list 412, the device 402 can prevent or deny the subsequent request 432.

The device 402 can deny the subsequent request 432 responsive to determining that the address 446 of the resource 442 that the respective request 432 originated from is not mapped to the address 446 of the requested resource 442 (e.g., third resource 442) identified in the subsequent request 432 in the mapping list 412. The device 402 can identify an entry of the mapping list 412 including the identifier 444 of the resource 442 that the subsequent request 432 originated from. The entry in the mapping list 412 can include a mapping between the identifier 444 of the resource 442 that the subsequent request 432 originated from and one or more identifiers 444 for resources 442 or identifiers 448 for addresses 446 associated with the originated resource 442. The device 402 can compare the identifier 444 for the requested resource 442 or an identifier 448 of an address 446 for the requested resource 442 to one or more identifiers 444, 448 included in the mapping list 412 to determine if the requested resource 442 is mapped to the originating resource 442. If the device 402 determines that the identifier 444 of the requested resource 442 identified in the subsequent request 432 or an identifier 448 of an address 446 for the requested resource 442 is not included in the mapping list, the device 402 can deny the subsequent request 432. The device 402 can deny the subsequent request 432 if the identifier 444 for the requested resource 442 or an identifier 448 of an address 446 for the requested resource 442 is not mapped to the identifier 444 of the originating resource 442 in the mapping list 412. In some embodiments, the device 402 can transmit a response 462 to the client 430 indicating that the subsequent request 432 has been denied.

The method 500 can return to (514) to wait or monitor for subsequent requests 423 from the client 430 during the session 450. In embodiments, the device 402 can end or de-active the session 450 between the client 430 and the device 402 in response not detecting activity and/or not receiving a request 432 from the client 430 within or over a determined timeout interval assigned to the session 450. In embodiments, the device 402 can use the timeout interval for the session 450 to monitor the session 450 such that in response to the client 430 being idle (e.g., no requests, no activity, no user interaction with one or more resources 442) for the determined timeout interval, the device ends the session 450 between the client 430 and the device 402.

Figure 6:
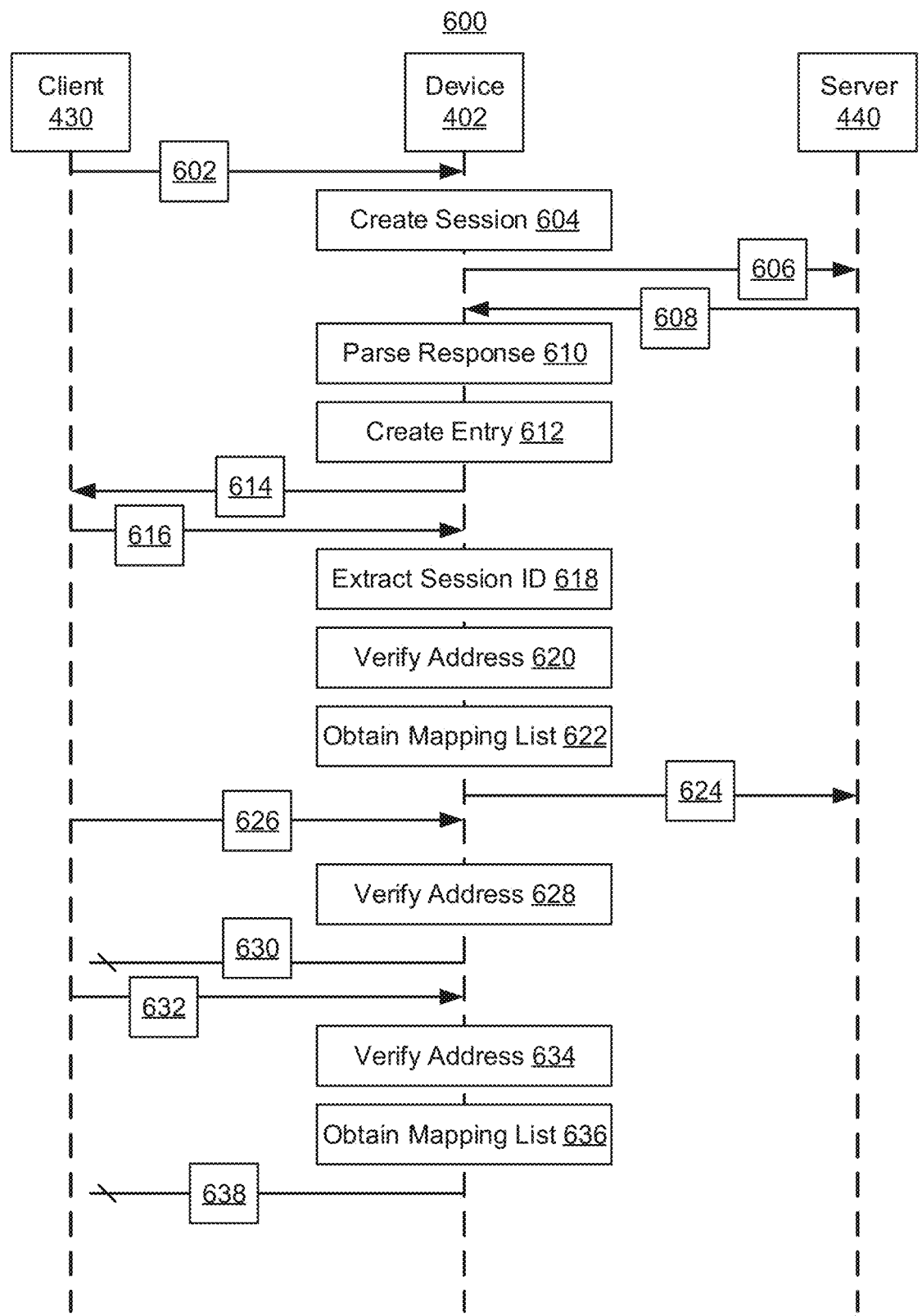
FIG. 6 is a sequence diagram of a method for performing header protection in distributed systems in accordance with an illustrative embodiment.

Referring now to FIG. 6, depicted is a sequence diagram of one embodiment of a method 600 for performing header protection in distributed systems in accordance with an illustrative embodiment. In brief overview, the method 600 can include one or more of: receiving a request (602), creating a session (604), providing a request to a server (606), receiving a response (608), parsing the response (610), creating an entry (612), providing the response (614), receiving a second request (616), extracting a session identifier (618), verifying an address (620), obtaining a mapping list (622), providing a request to a server (624), receiving a third request (626), verifying an address (628), blocking the third request (630), receiving a fourth request (632), verifying an address (634), obtaining a mapping list (636), and blocking the fourth request (638). The functionalities of the method 600 may be implemented using, or performed by, the components detailed herein in connection with FIGS. 1A-4.

Referring now to operation (602), and in some embodiments a request 432 can be received. A device 402 intermediary to a plurality of clients 430 and a plurality of servers 440 can receive a request 432 for a first resource 442 provided by or hosted by at least one server 440. The request 432 can include an HTTP request (e.g., HTTP GET request) and can identify a type of resource 442, a resource 442, and/or a server 440 the client 430 wants to access. In embodiments, the request 432 can include or correspond to an initial or first request 432 from the client 430, for example, prior to a session (e.g., active session, current session) being created between the client 430 and the device 402.

Referring now to operation (604), and in some embodiments, a session 450 can be created. The device 402 can create, responsive to the initial request 432 from the client 430, a session 450 (e.g., client session) for the client 430. In embodiments, during the request processing, the device 402 can determine that an active session 450 for the client 430 does not exist and establish a session 450 between the client 430 and the device 402 to access one or more resources 442 of the plurality of servers 440. The device 402 can generate or create a session identifier 452 for the session 450 between client 430 and the device 402 to track subsequent requests 432 relating to or originating from the client 430 and/or first resource 442 during the session 450. In embodiments, the device 402 can assign the session 450 a timeout interval such that in response to the client 430 being idle (e.g., no requests, no activity, no user interaction with one or more resources 442) for the determined timeout interval, the device ends the session 450 between the client 430 and the device 402. The session 450 and the session identifier 452 can be valid for the duration of the timeout interval of the session 450 or until the client 430 ends the session 450.

The device 402 can create a unique identifier 444 for the first resource 442 requested by the client 430. The resource identifier 444 can be used to identify the first resource 442 in one or more lists or databases maintained by the device 402 and/or track subsequent requests 432 received through the respective resource 442. In embodiments, the device 402 can convert an address (e.g., URL) or path name of the first resource 442 to create the resource identifier 444. The device 402 can create an access list 410 for the session 450. The device 402 can dynamically create the access list 410, for example, responsive to creating a session 450 between a client 430 and the device 402. In embodiments, an access list 410 can be created for each session 450 such that the access list 410 is unique to the respective session 450 and active when the respective session 450 is active. The access list 410 can identify one or more resources 442 accessed by the client 430 during the session 450. The access list 410 can include a plurality of entries with details or properties of an accessed resource 442 entered into at least one entry of the access list 410. The details or properties of an accessed resource 442 can include, but not limited to, an address (e.g., URL) of the resource, an identifier 444 for the resource, a name or title of the resource 442, and a server 440 providing the resource 442. The device 402 can tag or mark the resource 442 (e.g., first resource) requested by the client 430 as seen or access and add the identifier 444 for the resource 442 to the access list 410. The device 402 can add the address 446 of the requested resource 442, the identifier 444 of the requested resource 442 and the requested resource 442 to the access list 410 in an entry in the access list 410 for the respective resource 442. The device 402 can maintain the access list 410 for the duration of the session 450.

Referring now to operation (606), and in some embodiments, the request 432 can be provided to a server 440. The device 402 can select at least one server 440 from the plurality of servers 440 to forward to or provide the request 432. The device 402 can select the server 440 based in part on the first resource 442 requested and one or more resources 442 provided by the server 440. For example, the device 402 can identify the server 440 or at least one server 440 that provides the requested first resource 442 and forward the request 432 to the identified server 440.

Referring now to operation (608), and in some embodiments, a response 462 can be received from the server 440. The device 402 can receive a response 462 (e.g., HTTP response) for the requested first resource 442 from the server 440. The response 462 can include the requested first resource 442 or one or more addresses 446 to access the first resource 442. In some embodiments, the response 462 or first resource 442 can include one or more addresses 446 (e.g., URLs) to access one or more additional or other resources 442 through the first resource 442. For example, first resource 442 can include a first web page of a web site and include one or more URLs 446 embedded within the first resource 442 or included with the first resource 442 to access additional resources 442 (e.g., second resource, subsequent resource), such as but not limited to a web page within the same website as the first resource 442.

Referring now to operation (610), and in some embodiments, the response 462 can be parsed. The device 402 can parse or examine the response 462 to identify one or more addresses 446 included with the response 462 and/or first resource 442. In embodiments, each of the addresses 446 can enable or provide access to a different resource 442. For each identified address 446, the device 402 generates a unique identifier 448 included with the first resource 442. In embodiments, the device 402 can create a unique identifier 448 for the URLs (e.g., addresses 446) included with the response 462 and/or embedded within the first resource 442. The addresses 446 can be converted from a first format to a second format to create the address identifier 448. The identifier 448 for an address 446 can include numerals, alphanumeric characters, punctuation characters, symbols and any combination of numerals, alphanumeric characters, punctuation characters, and symbols.

Referring now to operation (612), and in some embodiments, an entry can be created for an address provided in the response 462. The device 402 can create a mapping list 412 for the session 450, for example, if a mapping list 412 doesn't already exist, and create an entry for the first resource 442 in the mapping list 412. The entry for the first resource 442 in the mapping list 412 can map or link the first resource 442 to each of the one or more addresses 446 (e.g., resource) included within or embedded within the first resource 442. In embodiments, the device 402 can map the address 446 or identifier 444 of the first resource 442 to each identifier 448 of each address 446 included with or embedded within the first resource 442. The mapping list 412 can indicate addresses 446 that the client 430 is approved to access through the first resource 442, for example, by interacting (e.g., click on, hover, select) with the respective address 446 within the first resource 442. The device 402 can use the mapping list to determine whether subsequent requests 432 received using the addresses 446 originated from the first resource 442 and correspond to a valid resource 442 or are fraudulent or malicious attempts to access a resource 442 using the respective address 446.

Referring now to operation (614), and in some embodiments, the response 462 can be provided to the client 430. The device 402 can provide the response 462 (e.g., HTTP response) including the requested first resource 442 to the client 430. The response 462 can include the first resource 442 or an address 446 to access the first resource 442 and the session identifier 452 for the session 450 between the client 430 and the device 402. The session identifier 452 can be included within a header of the response 462 and/or first resource such that in response to the client 430 transmitting a subsequent request 432 through the first resource 442, the session identifier 452 is included in the subsequent request 432. In one embodiments, the device 402 can transmit the response 462 to the client 430 and include a 'set.cookie' header to include the session identifier 452 (e.g., cookies) into a header portion of the response 462 to cause or instruct the client 430 or agent executing on the client 430 to transmit the session identifier 452 for subsequent requests 432 received from the client 430 via one or more addresses 446 of the first resource 442. The device 402 can provide to the client 430 the first resource 442 including one or more addresses 446 linked to other resources 442 associated with the first resource 442 and the identifier 452 for the session 450 between the client 430 and the device 402.

Referring now to operation (616), and in some embodiments, a subsequent or second request 432 can be received. The device 402 can receive a second request 432 from the client 430 that includes the session identifier 452 for the current session 450 between the client 430 and the device 402. The session identifier 452 indicates that the second request 432 originates from the first resource 442. For example, the session identifier 452 can indicate that the second request 432 was generated responsive to an interaction (e.g., click on, select) with at least one address 446 included with or embedded with the first resource 442.

Referring now to operation (618), and in some embodiments, a session identifier 452 can be obtained from the subsequent or second request 432. The device 402 can extract or obtain the session identifier 452 from the second request 432. In embodiments, the device 402 can extract or obtain the session identifier 452 from a header of the second request 432. The device can use the session identifier 452 to determine session details for the current session 450 between the client 430 and the device 402. The details can include an access list 410 indicating one or more addresses 446 accessed by the client 430 during the session 450 and a mapping list 412 indicating addresses 446 or identifiers 444 mapped to one or more other addresses 446 or identifiers 444 and approved for the client 430 to access during the session 450. The device 402 can validate or determine if the session identifier 452 included with the subsequent request 432 is a valid request 432, for example, for an active or current session 450. To validate the session identifier 452, the device 402 can compare the session identifier 452 to a listing of identifiers 452 for active or current sessions 450 to the device. If the session identifier 452 is included within the listing of identifiers 452 for active or current sessions 450 to the device 402, the device 402 can determine the session identifier 452 is valid.

Referring now to operation (620), and in some embodiments, a determination can be made if an address 446 that the subsequent or second request 432 originated through is included in an access list 410. The device 402 can determine if the address 446 that the second request 432 originated from or was generated through is included in the access list 410. In embodiments, the address 446 that the second request 432 originated from or was generated through can include or correspond to the address 446 of the resource 442 (e.g., first resource 442) that the client 430 interacted with to generate the second request 432. The device 402 can compare the address 446 of the first resource 442 to one or more addresses 446 included in the access list 410 to determine if the made if the address 446 of the resource 442 that the subsequent request 432 originated from is included in the access list 410. If the address 446 of the resource 442 that the subsequent request 432 originated from is included in the access list 410, the method 600 can move to (622) to obtain the mapping list 412.

Referring now to operation (622), and in some embodiments, mapping data for an address 446 included with the subsequent or second request 432 can be obtained and a determination can be made if the address 446 included with the subsequent or second request 432 is included in a mapping list 412. The device 402 can use the session identifier 452 to identify and retrieve the mapping list 412 for the session 450. In embodiments, the device 402 can use the session identifier 452 to identify an entry in a database 408 of the device 402 corresponding the session 450 and retrieve the mapping list 412 for the session 450 from the database.

The device 402 can determine if an address of a resource 442, a second resource 442 (e.g., requested resource), identified in the second request 432 is included within the mapping list 412. The device 402 can compare the address 446 identified in the second request 432 to one or more addresses 446 included in the mapping list 412 for the first resource 442 to determine if the address 446 identified in the second request 432 was previously mapped to the address 446 of the first resource 442. The device 402 can determine whether the address 446 or identifier 444 of the second resource 442 identified in the second request 432 is mapped to the address 446 or identifier 444 of the first resource 442 in the mapping list 412 indicating addresses 446 and/or identifiers 444 previously mapped by the device 402 for access by the client 430 during the session 450.

The device 402 can compare the address 446 of the second resource 442 identified in the second request 432 to the one or more addresses 446 included in the mapping list 412 for the first resource 442. In embodiments, the device 402 can compare the resource identifier 444 of the second resource 442 identified in the second request 432 to one or more resource identifiers 444 included in the mapping list 412 to determine if the originating resource 442 is included in the mapping list 412. If the address 446 or resource identifier 444 for the second resource 442 identified in the second request 432 is included in the mapping list 412, the device 402 can determine if the second resource 442 is mapped to the first resource 442 and the client 430 is approved to access the second resource 442.

Referring now to operation (624), and in some embodiments, the subsequent or second request 432 can be provided to a server 440. The device 402 can provide the second request 432 to the same server 440 that handled the first request 432 or a different server 440 of the plurality of servers 440. The device 402 can select the server 440 based in part on the second resource 442 requested and one or more resources 442 provided by the server 440. For example, the device 402 can identify the server 440 or at least one server 440 that provides the requested first resource 442 and forward the request 432 to the identified server 440. In embodiments, a response 462 to the second request 432 from the server 440 can be provided to the client 430.

Referring now to operation (626), and in some embodiments, a third request 432 can be received. The device 402 can receive a third request 432 from the client 430 that includes a session identifier 452 for a session 450 between the client 430 and the device 402. In some embodiments, the third request 432 may not include a session identifier 452 and can correspond to a fraudulent or malicious request 432.

Referring now to operation (628), and in some embodiments, an address 446 of the third request 432 can be verified. The device 402 can make a determination if an address 446 that the third request 432 originated through is included in the access list 410 for the session 450. In embodiments, the address 446 included with the third request 432 can correspond to an address 446 of a third resource 442 that the third request 432 was generated from or originated from, for example, responsive to an interaction with at least one address 446 included within the respective resource 442. The address 446 can include or correspond to a referral URL for a third resource 442 that the that the third request 432 originated through (e.g., referred through) and the device 402 can check or verify that the referral URL (e.g., address 446) included in the header of the third request 432 is included in the access list 410 for the session 450. The device 402 can compare the address 446 of the third resource 442 included with the third request 432 to one or more addresses 446 included in the access list 410 to determine if the address 446 of the third resource 442 included with the third request 432 is included in the access list 410. If the address 446 of the third resource 442 included with the third request 432 is not included in the access list 410, the method 600 can move to (630) to block or prevent the third request 432.

Referring now to operation (630), and in some embodiments, the third request 432 can be denied. The device 402 can deny, block or prevent the third request 432 responsive to determining that the address 446 (e.g., referral URL) of the third resource 442 included with the third request 432 is not included in the access list 410. The address 446 of the third resource 442 included with the third request 432 not being included in the access list 410 can indicate a fraudulent or malicious request 432 that originated from an unapproved source or resource 442. In embodiments, the device 402 can use different criteria or multiple criteria to provide different levels of protection to detect and prevent malicious requests 432 or malicious attacks intended for the plurality of servers 440 and/or resources 442 provided by the servers 440. The device 402 can deny the third request 432 based in part on determining that the address 446 included with the third request 432 is different from one or more addresses 446 previously accessed by the client 430 during the session 450 and not approved by the device 402. In some embodiments, the device 402 can transmit a response 462 to the client 430 indicating that the third request 432 has been denied.

Referring now to operation (632), and in some embodiments, a fourth request 432 can be received. The device 402 can receive a fourth request 432 during the session 450 from the client 430 that includes a session identifier 452 for a session 450 between the client 430 and the device 402. The session identifier 452 can correspond to or identify a current or active session 450 between the client 430 and the device 402.

Referring now to operation (634), and in some embodiments, an address 446 of the fourth request 432 can be verified. The device 402 can make a determination if an address 446 that the fourth request 432 originated through is included in the access list 410 for the session 450. In embodiments, the address 446 included with the fourth request 432 can correspond to an address 446 of a fourth resource 442 that the fourth request 432 was generated from or originated from, for example, responsive to an interaction with at least one address 446 included within the respective resource 442. In embodiments, the address 446 of the fourth resource 442 can include or correspond to an address 446 (e.g., link) provide with or embedded within a resource 442 previously accessed by the client 430 (e.g., first resource 442) or an address 446 of a resource 442 previously accessed by the client 430. For example, the address 446 can include or correspond to a referral URL for a fourth resource 442 that the that the fourth request 432 originated through (e.g., referred through) and the device 402 can check or verify that the referral URL (e.g., address 446) included in the header of the fourth request 432 is included in the access list 410 for the session 450. The device 402 can use the comparison to determine if the client 430 has previously accessed the fourth resource 442 during the session 450. The device 402 can compare the address 446 of the fourth resource 442 included with the fourth request 432 to one or more addresses 446 included in the access list 410 to determine if the address 446 of the of the fourth resource 442 included with the fourth request 432 is included in the access list 410. If the address 446 of the fourth resource 442 included with the fourth request 432 is included in the access list 410, the method 600 can move to (636) to the method 600 can move to (636) to obtain the mapping list 412.

Referring now to operation (636), and in some embodiments, mapping data for an address 446 included with the fourth request 432 can be obtained and a determination can be made if the address 446 included with the fourth request 432 is included in a mapping list 412. The address 446 can include or correspond to a request URL or an address of a requested resource 442 that the client 430 requests to access. The device 402 can compare the address 446 identified in the fourth request 432 to one or more addresses 446 included in the mapping list 412 for the session 450 to determine if the address 446 identified in the fourth request 432 was previously mapped to one or more addresses 446 accessed by the client 430 during the session 450. The device 402 can determine whether an identifier 444 of the requested resource 442 identified in the fourth request 432 is mapped to one or more addresses 446 or identifiers 444 of one or more resources 442 in the mapping list 412 for the session 450 indicating addresses 446 and/or identifiers 444 were previously mapped by the device 402 for access by the client 430 during the session 450. If the address 446 or resource identifier 444 for the resource 442 identified in the fourth request 432 is not included in the mapping list 412, the device 402 can determine that the fourth request 432 may be a fraudulent or malicious request 432 and the method 600 can move to (638) to block the fourth request 432.

Referring now to operation (638), and in some embodiments, the fourth request 432 can be denied. The device 402 can deny, block or prevent the fourth request 432 responsive to determining that the address 446 or resource identifier 444 for the resource 442 identified in the fourth request 432 is not included in the mapping list 412. The device 402 can deny the fourth request 432 based in part on determining that the address 446 included with the fourth request 432 is different from one or more addresses 446 mapped to one or more previously accessed resources 442 by the client 430 during the session 450 and not approved by the device 402. In some embodiments, the device 402 can transmit a response 462 to the client 430 indicating that the fourth request 432 has been denied. The method 600 can return to (616) to wait or monitor for subsequent requests 423 from the client 430 during the session 450.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   receiving, by a first device from a second device that accessed a first resource at a first address during a session via the first device, a request to access a second resource at a second address different than the first address of the first resource, the request identifying an identifier of the session;
   identifying, by the first device using a list maintained by the first device based on the identifier of the session, that the second device had accessed the first address of the first resource during the session;
   determining, by the first device using the list, that the second address of the second resource is mapped to the first address of the first resource for the session; and
   providing, by the first device responsive to the request, the second device access to the second resource responsive to determining that the second address of the second resource is mapped to the first address of the first resource for the session.

2. The method of claim 1, further comprising establishing, by the first device, the list for the session responsive to establishing the session between the first device and the second device.

3. The method of claim 1, further comprising generating, by the first device, a first identifier for the first address of the first resource.

4. The method of claim 3, further comprising mapping, by the first device, in the list the first address of the first resource to the first identifier.

5. The method of claim 1, further comprising receiving, by the first device, from the second device the first resource, the first resource including the first address and determining, by the first device, the first address from the first resource.

6. The method of claim 1, further comprising identifying, by the first device, the list for the session using the identifier of the session.

7. A method comprising:
   receiving, by a first device from a second device that accessed a first resource at a first address during a session via the first device, a request to access a second resource at a second address different than the first address of the first resource, the request identifying an identifier of the session;
   identifying, by the first device using a list maintained by the first device based on the identifier of the session, that the second device had accessed the first address of the first resource during the session;
   determining, by the first device using the list, that the second address of the second resource is not mapped to the first address of the first resource for the session; and
   denying, by the first device responsive to the request, the second device access to the second resource responsive to determining that the second address of the second resource is not mapped to the first address of the first resource for the session.

8. The method of claim 7, further comprising establishing, by the first device, the list for the session responsive to establishing the session between the first device and the second device.

9. The method of claim 7, further comprising generating, by the first device, a first identifier for the first address of the first resource.

10. The method of claim 9, further comprising mapping, by the first device, in the list the first address of the first resource to the first identifier.

11. The method of claim 7, further comprising receiving, by the first device, from the second device the first resource, the first resource including the first address and determining, by the first device, the first address from the first resource.

12. The method of claim 7, further comprising identifying, by the first device, the list for the session using the identifier of the session.

13. A system comprising:
   a first device, comprising one or more processors and memory, configured to:
   receive from a second device that accessed a first resource at a first address during a session via the first device, a request to access a second resource at a second address different than the first address of the first resource, the request identifying an identifier of the session;
   identify, using a list maintained by the first device for the identifier of the session, that the second device had accessed the first address of the first resource during the session;
   determine, using the list, whether the second address of the second resource is mapped to the first address of the first resource for the session; and
   determine, responsive to the request, whether to provide or deny access by the second device access to the second resource responsive to determining whether the second address of the second resource is mapped to the first address of the first resource for the session.

14. The system of claim 13, wherein the first device is further configured to determine that the second address of the second resource is mapped to the first address of the first resource for the session and provide access to the second resource.

15. The system of claim 13, wherein the first device is further configured to determine that the second address of the second resource is not mapped to the first address of the first resource for the session and deny access to the second resource.

16. The system of claim 13, wherein the first device is further configured to establish the list for the session responsive to establishing the session between the first device and the second device.

17. The system of claim 13, wherein the first device is further configured to generate a first identifier for the first address of the first resource.

18. The system of claim 17, wherein the first device is further configured to map in the list the first address of the first resource to the first identifier.

19. The system of claim 13, wherein the first device is further configured to receive from the second device the first resource, the first resource including the first address and determining the first address from the first resource.

20. The system of claim 13, wherein the first device is further configured to identify the list for the session using the identifier of the session.

* * * * *